US009804430B2

(12) United States Patent
Won et al.

(10) Patent No.: US 9,804,430 B2
(45) Date of Patent: Oct. 31, 2017

(54) DISPLAY DEVICE

(71) Applicant: LG ELECTRONICS INC., Seoul (KR)

(72) Inventors: Hyojin Won, Seoul (KR); Yongho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/593,599

(22) Filed: May 12, 2017

(65) Prior Publication Data
US 2017/0248815 A1 Aug. 31, 2017

Related U.S. Application Data

(63) Continuation of application No. 15/398,352, filed on Jan. 4, 2017, now Pat. No. 9,690,129.

(30) Foreign Application Priority Data

Jan. 5, 2016 (KR) ........................ 10-2016-0001186

(51) Int. Cl.
G09F 13/08 (2006.01)
G02F 1/1333 (2006.01)
(52) U.S. Cl.
CPC .............. *G02F 1/133308* (2013.01); *G02F 2001/133314* (2013.01); *G02F 2001/133317* (2013.01); *G02F 2001/133322* (2013.01)
(58) Field of Classification Search
CPC ......... G02F 1/133308; G02F 1/133608; G02F 2001/133314
See application file for complete search history.

(56) References Cited

U.S. PATENT DOCUMENTS

| 7,237,937 B2* | 7/2007 | Kawashima ...... G02F 1/133308 345/104 |
| 2006/0152471 A1* | 7/2006 | Sugawara ......... G02F 1/133308 345/104 |
| 2007/0064378 A1* | 3/2007 | Lo ..................... G02F 1/133308 361/679.22 |
| 2010/0118479 A1 | 5/2010 | Choi |
| 2011/0187956 A1 | 8/2011 | Kim et al. |
| 2015/0131319 A1 | 5/2015 | Kwak et al. |
| 2015/0261033 A1 | 9/2015 | Shin et al. |

(Continued)

FOREIGN PATENT DOCUMENTS

KR    10-2015-0058669 A    5/2015

*Primary Examiner* — Evan Dzierzynski
(74) *Attorney, Agent, or Firm* — Birch, Stewart, Kolasch & Birch, LLP

(57) ABSTRACT

A display device including a display panel having a back surface and a front surface; a side frame extending along a side of the display panel and including an inner frame facing a part of the back surface of the display panel and an outer frame, the outer frame having an exterior flat surface and an exterior inclined surface inclining towards the display panel; a main frame coupled with the side frame; and a light source between the display panel and the main frame. Further, the part of the back surface of the display panel is fixed on the inner frame of the side frame, the side frame includes a coupling protrusion, and the main frame is inserted into a space formed by the coupling protrusion of the side frame.

30 Claims, 32 Drawing Sheets

(56) References Cited

U.S. PATENT DOCUMENTS

2015/0277179 A1   10/2015  Nishi et al.
2015/0301391 A1*  10/2015  Li .................... G02F 1/133308
                                                          349/58
2015/0351261 A1   12/2015  Lee et al.

* cited by examiner

DISPLAY DEVICE

This application is a Continuation of application Ser. No. 15/398,352, filed on Jan. 4, 2017, which claims priority under 35 U.S.C. §119(a) to Application No. 10-2016-0001186, filed in Republic of Korea on Jan. 5, 2016, all of which are hereby expressly incorporated by reference into the present application.

BACKGROUND OF THE INVENTION

Field of the Invention

The present disclosure relates to a display device.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

SUMMARY OF THE INVENTION

Accordingly, an object of the present disclosure is to address the above-described and other problems.

Another aspect of the present disclosure is to provide a display device having a thin profile and a rigidity structure.

In one aspect, there is provided a display device comprising: a display panel; a side frame extended along a side of the display panel and positioned adjacent to an edge of the display panel, wherein the side frame comprises a flat portion facing a part of the back surface of the display panel, and an inclined portion extended rearward from the flat portion; a main frame being a plate and coupled with the side frame; and a light source between the display panel and the main frame, wherein the part of the back surface of the display panel is fixed on the flat portion of the side frame, and wherein the inclined portion of the side frame is exposed outside of the display device.

According to at least one aspect of the present disclosure, the present disclosure can provide the display device having a thin profile and a rigidity structure.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
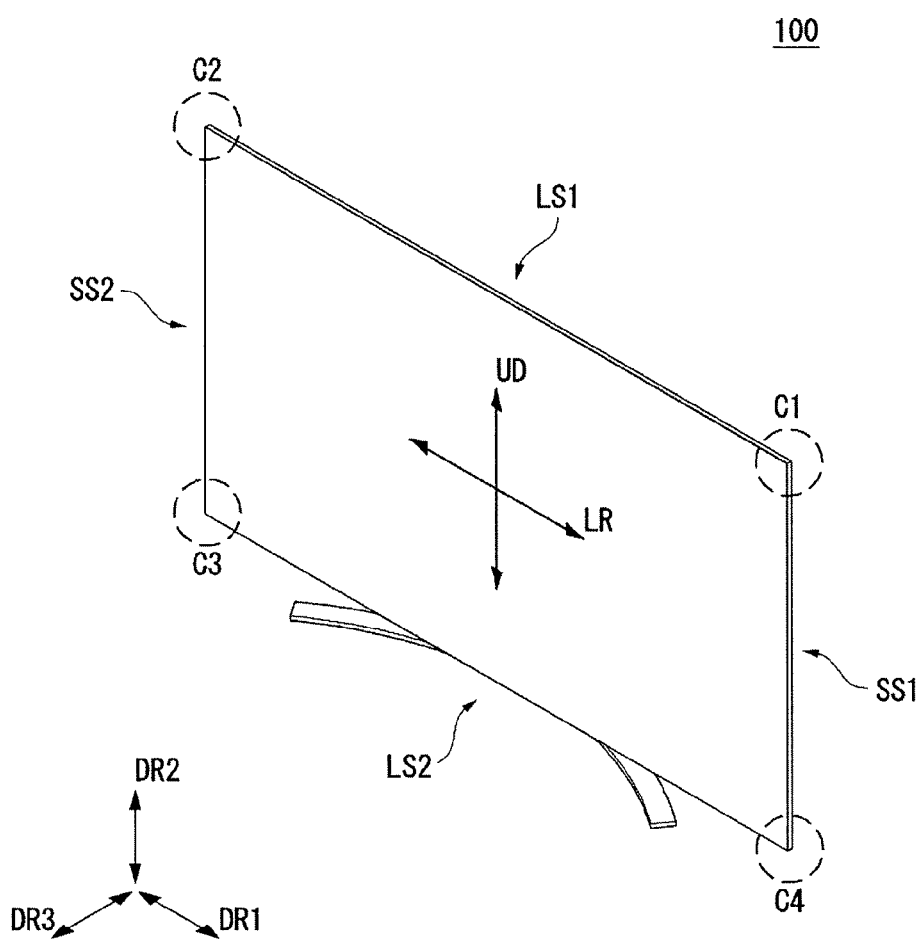
FIGS. 1 to 4 illustrate a general configuration of a display device according to an example embodiment of the invention.

Reference will now be made in detail embodiments of the invention examples of which are illustrated in the accompanying drawings. Since the present invention can be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. can be used to describe various components, but the components are not limited by such terms. The terms are used only for the purpose of distinguishing one component from other components. For example, a first component can be designated as a second component without departing from the scope of the present invention. In the same manner, the second component can be designated as the first component. The term "and/or" encompasses both combinations of the plurality of related items disclosed and any item from among the plurality of related items disclosed.

When an arbitrary component is described as "being connected to" or "being linked to" another component, this should be understood to mean that still another component(s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context. In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, the embodiments of the invention are described using a liquid crystal display panel as an example of a display panel. Other display panels can be used. For example, a plasma display panel (PDP), a field emission display (FED) panel, and an organic light emitting diode (OLED) display panel can be used.

In addition, a display device 100 includes a first long side LS1, a second long side LS2 opposite the first long side LS1, a first short side SS1 adjacent to the first long side LS1 and the second long side LS2, and a second short side SS2 opposite the first short side SS1.

In the embodiment disclosed herein, the first short side SS1 can be referred to as a first side area; the second short side SS2 can be referred to as a second side area opposite the first side area; the first long side LS1 can be referred to as a third side area which is adjacent to the first side area and the second side area and is positioned between the first side area and the second side area; and the second long side LS2 can be referred to as a fourth side area which is adjacent to the first side area and the second side area, is positioned between the first side area and the second side area, and is opposite to the third side area.

Further, lengths of the first and second long sides LS1 and LS2 are longer than lengths of the first and second short sides SS1 and SS2 for the sake of brevity and ease of reading. However, the lengths of the first and second long sides LS1 and LS2 can be almost equal to the lengths of the first and second short sides SS1 and SS2.

In the following description, a first direction DR1 can be a direction parallel to the long sides LS1 and LS2 of the display device 100, and a second direction DR2 can be a direction parallel to the short sides SS1 and SS2 of the display device 100. Further, a third direction DR3 can be a direction vertical to the first direction DR1 and/or the second direction DR2. The first direction DR1 and the second direction DR2 can be commonly referred to as a horizontal direction and the third direction DR3 can be referred to as a vertical direction.

Further, a side or a surface, on which the display device 100 displays an image, can be referred to as a front side or a front surface. When the display device 100 displays the image, a side or a surface, at which the image cannot be observed, can be referred to as a back side or a back surface. When the display device 100 is observed at the front side or the front surface, the first long side LS1 can be referred to as an upper side or an upper surface. In the same manner as the first long side LS1, the second long side LS2 can be referred to as a lower side or a lower surface. Further, the first short side SS1 can be referred to as a left side or a left surface, and the second short side SS2 can be referred to as a right side or a right surface.

Further, the first long side LS1, the second long side LS2, the first short side SS1, and the second short side SS2 can be referred to as edges of the display device 100. Positions where the first long side LS1, the second long side LS2, the first short side SS1, and the second short side SS2 meet one another can be referred to as corners. For example, a position where the first long side LS1 and the first short side SS1 meet each other can be referred to as a first corner C1; a position where the first long side LS1 and the second short side SS2 meet each other can be referred to as a second corner C2; a position where the second short side SS2 and the second long side LS2 meet each other can be referred to as a third corner C3; and a position where the second long side LS2 and the first short side SS1 meet each other can be referred to as a fourth corner C4.

In the embodiment disclosed herein, a direction from the first short side SS1 to the second short side SS2 or a direction from the second short side SS2 to the first short side SS1 can be referred to as a left-right direction LR. A direction from the first long side LS1 to the second long side LS2 or from the second long side LS2 to the first long side LS1 can be referred to as an up-down direction UD.

Figure 2:
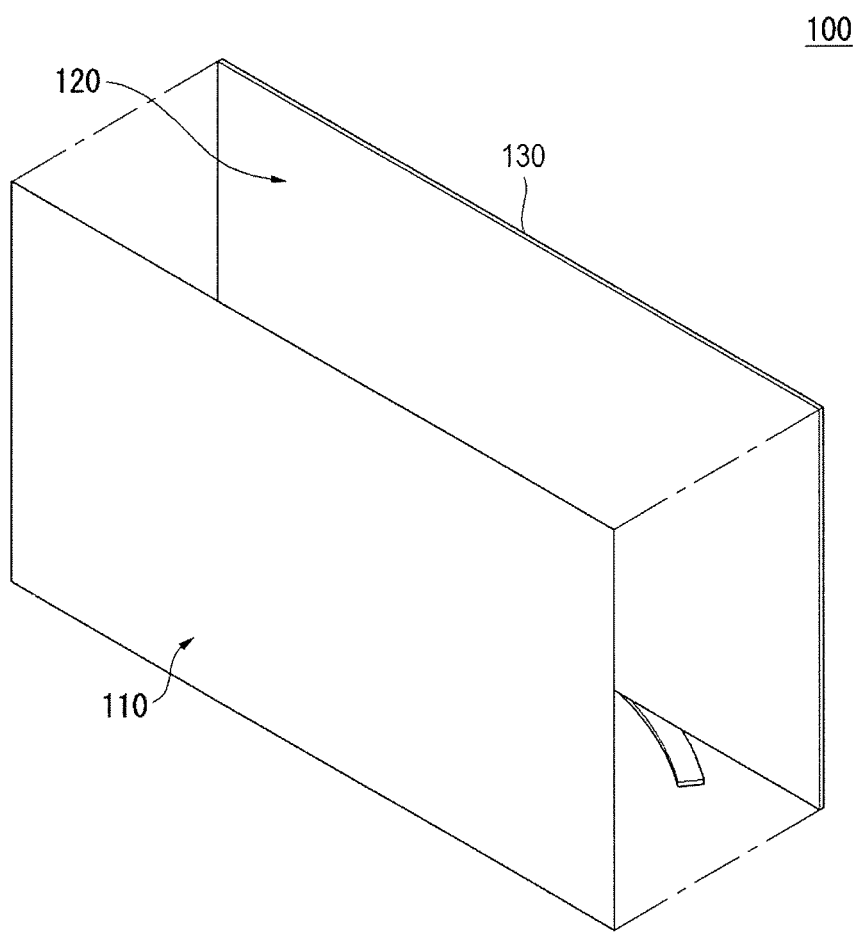

FIGS. 1 to 4 illustrate general configuration of a display device 100 according to an example embodiment of the invention. Referring to FIGS. 1 and 2, a display panel 110 is provided at a front surface of the display device 100 and displays an image. The display panel 110 divides the image into a plurality of pixels and outputs the image while controlling the color, brightness, and chroma of each pixel. The display panel 110 includes an active area, on which the image is displayed, and an inactive area, on which the image is not displayed. The display panel 110 also includes a first substrate and a second substrate which are positioned opposite each other with a liquid crystal layer interposed therebetween. For example, the display panel 110 includes a front substrate and a back substrate.

A backlight unit 120 is positioned in the rear of the display panel 110 and includes a plurality of light sources. The light sources of the backlight unit 120 can be arranged in an edge type or a direct type. In the instance of the edge type backlight unit 120, a light guide plate can be added.

Further, the backlight unit 120 can be driven in an entire driving method or a partial driving method, such as a local dimming method and an impulsive driving method. The backlight unit 120 may also include an optical sheet or an optical layer. A frame 130 is also shown in FIG. 2.

Figure 3:
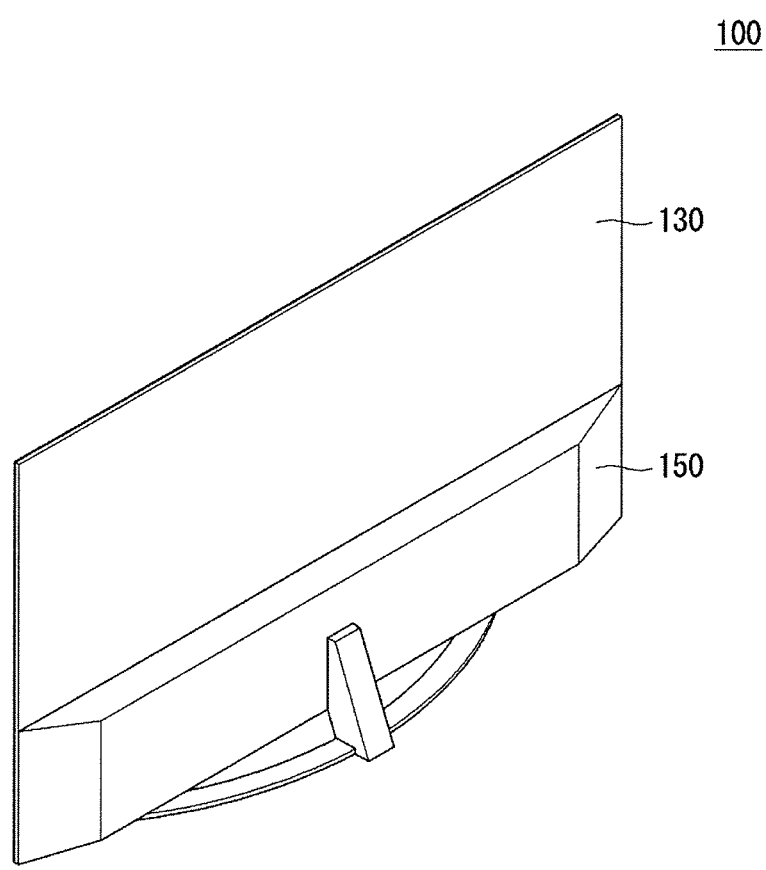
Figure 4:
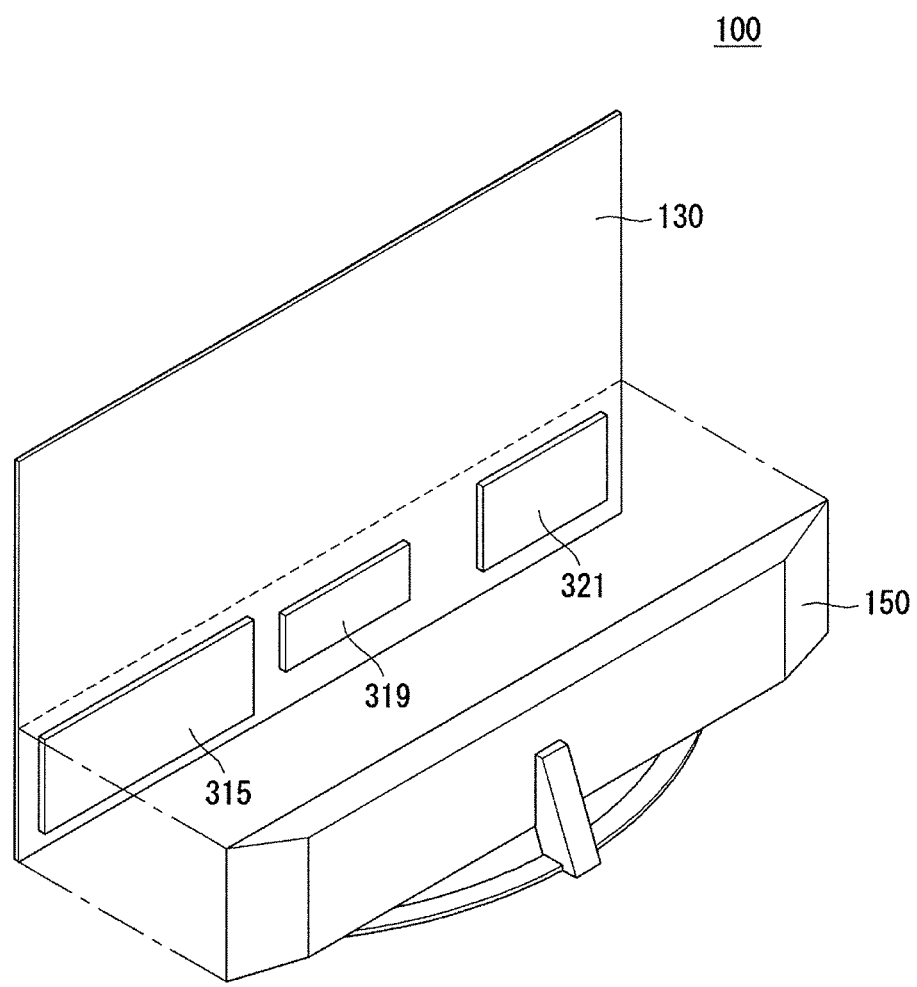

Referring to FIGS. 3 and 4, the frame 130 can support components of the display device 100. For example, the frame 130 can be coupled to the backlight unit 120. The frame 130 can be formed of a metal material, for example, an aluminum alloy and be referred to as a main frame.

As shown, a back cover 150 is also positioned at a back surface of the display device 100. The back cover 150 protects the inner configuration of the display device 100 from the outside. At least a portion of the back cover 150 is coupled to the frame 130. For example, the back cover 150 can be an injection production (or injection molded) formed of a resin material.

A power supply board 315 includes a printed circuit board (PCB) supplying electric power to the display device 100. The power supply board 315 can also convert AC electric power into DC electric power. Further, a main board 321 includes a printed circuit board providing an interface for operating the display device 100. Further, the main board 321 can check and control an operation state of each component of the display device 100.

In addition, a timing controller board 319 includes a printed circuit board transmitting electric power or signals received from the power supply board 315 or the main board 321 to the display panel 110. The timing controller board 319 can be electrically connected to the display panel 110 positioned at a front surface of the frame 130 through flat flexible cables. The power supply board 315, the main board 321, and/or the timing controller board 319 can be commonly referred to as a controller.

Figure 5:
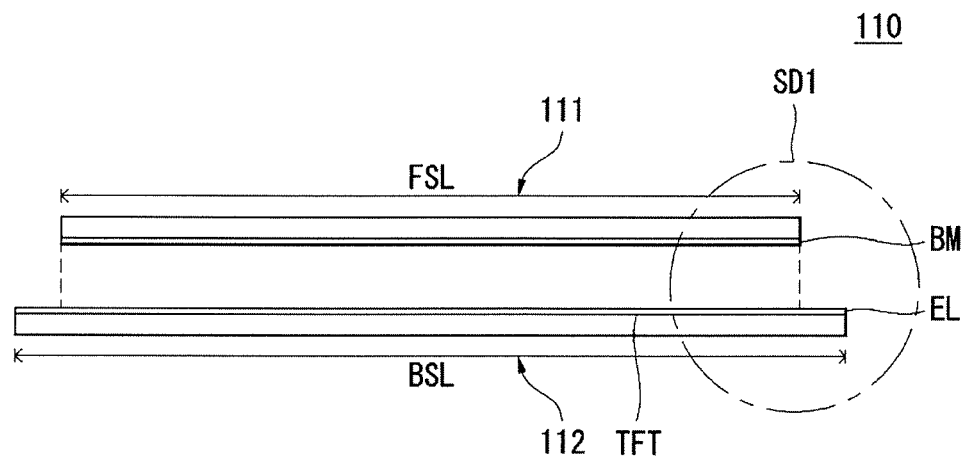
FIGS. 5 to 7 illustrate examples of a display panel related to an example embodiment of the invention.
Figure 6:
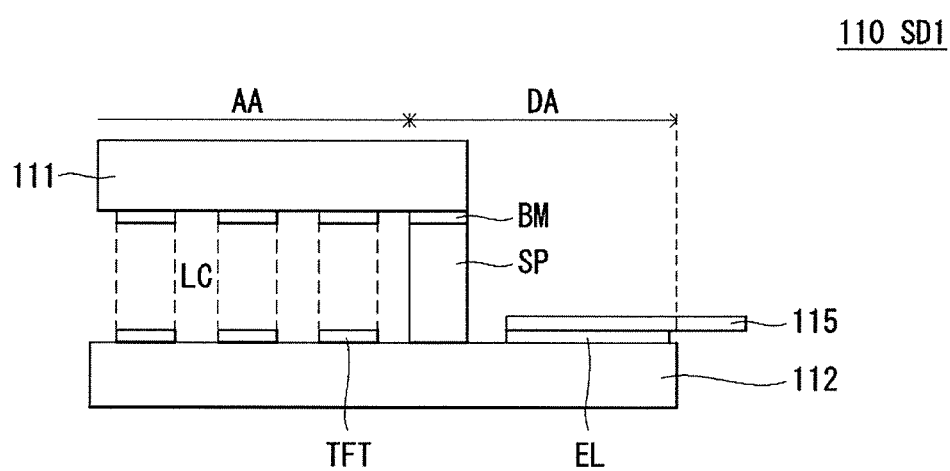
Figure 7:
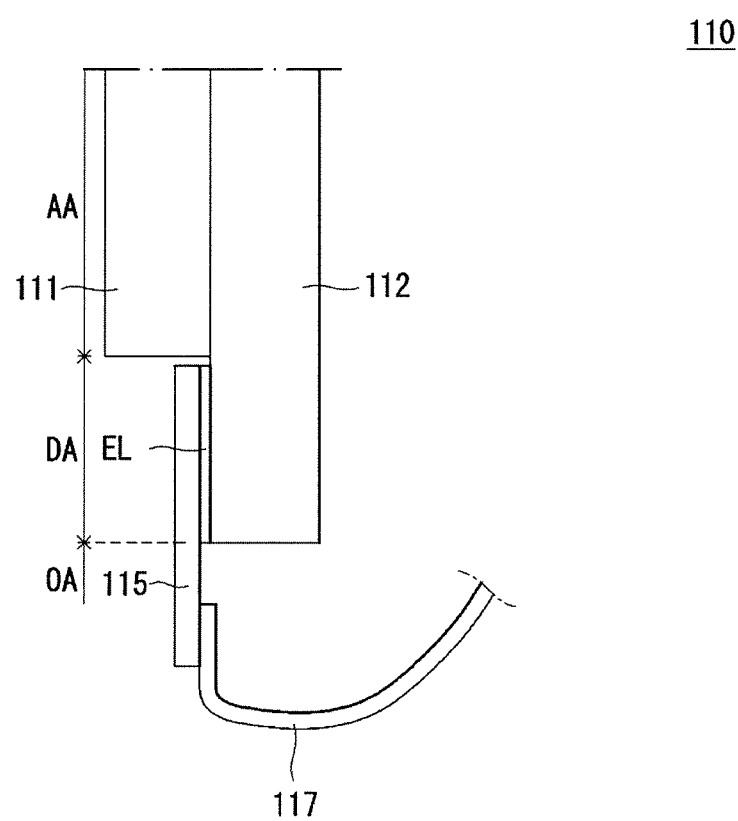

Next, FIGS. 5 to 7 illustrate examples of a display panel according to an example embodiment of the invention. Referring to FIG. 5, the display panel 110 includes a first substrate 111 and a second substrate 112. The first substrate 111 is exposed to the outside while forming the front surface of the display device 100, and the second substrate 112 is positioned opposite the first substrate 111. Liquid crystals are filled between the first substrate 111 and the second substrate 112. Namely, a liquid crystal layer can be formed between the first substrate 111 and the second substrate 112. The first substrate 111 can also be a front substrate, and the second substrate 112 can be a back substrate.

A length FSL of the front substrate 111 can be shorter than a length BSL of the back substrate 112, and the length BSL of the back substrate 112 can be longer than the length FSL of the front substrate 111. Namely, the length FSL of the front substrate 111 can be different from the length BSL of the back substrate 112. Further, the front substrate 111 may have a color filter, and the back substrate 112 may have a thin film transistor (TFT). The TFT includes a black material.

The length BSL of the back substrate 112 can be longer than the length FSL of the front substrate 111, so that TFT lines are connected to the outside of the display panel 110. Namely, an electrode line EL electrically connected to the TFT included in the back substrate 112 can be exposed to the outside due to a difference between the lengths of the front substrate 111 and the back substrate 112. The front substrate 111 can also include a cover layer BM corresponding to the TFT line. For example, the cover layer BM can be black. Hence, the cover layer BM can prevent the TFT line from being reflected on the outside of the display panel 110.

Referring to FIG. 6 which is an enlarged view of a portion SD1 of FIG. 5, a liquid crystal layer LC is formed between the front substrate 111 and the back substrate 112, and a spacer SP is positioned between the front substrate 111 and the back substrate 112. The spacer SP can uniformly maintain a distance between the front substrate 111 and the back substrate 112. Namely, the spacer SP can uniformly maintain a thickness of the liquid crystal layer LC filled in the display panel 110. Hence, the spacer SP can improve structural stability of the display panel 110.

The back substrate 112 includes a plurality of TFTs in a matrix form. The TFTs can be formed on a portion or the entire surface of the back substrate 112. The electrode line EL is electrically connected to the TFT and can be exposed to the outside of the display panel 110 due to a difference between the lengths of the front substrate 111 and the back substrate 112.

Further, the front substrate 111 includes the cover layer BM positioned opposite the TFT. Further, the cover layer BM can overlap the TFT. Namely, the cover layer BM can cover the TFT when viewed from a front surface of the display panel 110. For example, the cover layer BM can be black.

The display panel 110 includes an active area AA and an inactive area DA. The active area AA is an area, on which an image is displayed, and the inactive area DA is an area, on which the image is not displayed. An electrode 115 is electrically connected to the electrode line EL. The electrode 115 is positioned in the inactive area DA. Further, the electrode 115 can be bonded to the electrode line EL, which is exposed to the outside of the display panel 110 due to a difference between the lengths of the front substrate 111 and the back substrate 112, and can be electrically connected to the TFT. The electrode 115 can be a pad electrode.

Referring to FIG. 7, a member layer 117 can be electrically connected to the electrode 115. For example, the member layer 117 can be a chip-on-film (COF), a chip-on-glass (COG), a flexible printed circuit board (FPCB), a tape carrier package (TCP), and the like. Namely, the electrode line EL can be electrically connected to the TFT, the electrode 115 can be electrically connected to the electrode line EL, and the member layer 117 can be bonded to the electrode 115 and electrically connected to the electrode 115. The member layer 117 can bend toward the rear of the back substrate 112 and can be extended toward the main board 321, the timing controller board 319, or the power supply board 315 which are positioned in the rear of the back substrate 112. The member layer 117 can also be extended to an outer area OA because the length of the back substrate 112 is longer than the length of the front substrate 111. Namely, a configuration or a length of the display panel 110 can include a sum of a length of the active area AA, a length of the inactive area DA, and a length of the electrode 115 or the member layer 117 positioned in the outer area OA.

Figure 8:
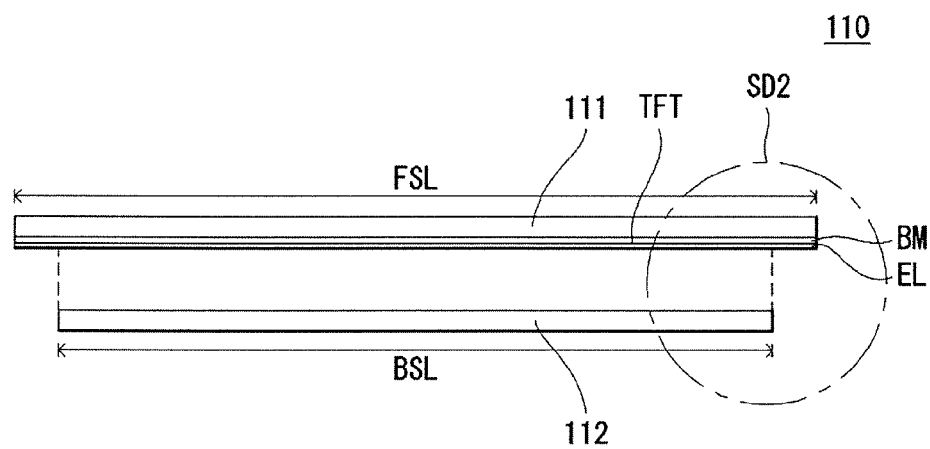
FIGS. 8 to 10D illustrate another example of a display panel according to an example embodiment of the invention.
Figure 9:
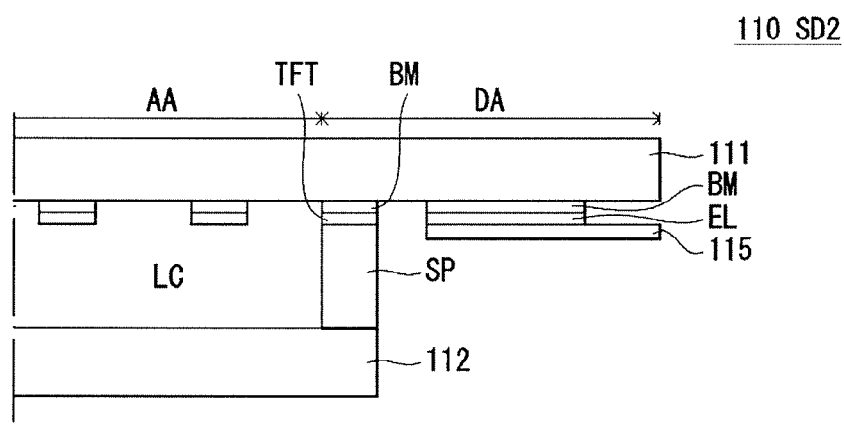

Next, FIGS. 8 to 10 illustrate another example of a display panel according to an example embodiment of the invention. Referring to FIG. 8, the display panel 110 includes a first substrate 111 and a second substrate 112. The first substrate 111 is exposed to the outside while forming the front surface of the display device 100, and the second substrate 112 is positioned opposite the first substrate 111. Liquid crystals is filled between the first substrate 111 and the second substrate 112. Namely, a liquid crystal layer can be formed between the first substrate 111 and the second substrate 112. The first substrate 111 can be a front substrate, and the second substrate 112 can be a back substrate.

A length FSL of the front substrate 111 can be longer than a length BSL of the back substrate 112, and the length BSL of the back substrate 112 can be shorter than the length FSL of the front substrate 111. Namely, the length FSL of the front substrate 111 can be different from the length BSL of the back substrate 112. The front substrate 111 can also have a TFT, and the back substrate 112 can have a color filter.

Further, the length FSL of the front substrate 111 can be longer than the length BSL of the back substrate 112, so that an electrical line of the TFT is connected to the outside of the display panel 110. Namely, an electrode line EL electrically connected to the TFT included in the front substrate 111 can be exposed to the outside due to a difference between the lengths of the front substrate 111 and the back substrate 112. The front substrate 111 includes a cover layer BM corresponding to the TFT line. For example, the cover layer BM can be black. Hence, the cover layer BM can prevent the TFT line from being reflected on the outside of the display panel 110.

Referring to FIG. 9 which is an enlarged view of a portion SD2 of FIG. 8, a liquid crystal layer LC is formed between the front substrate 111 and the back substrate 112. Further, a spacer SP is positioned between the front substrate 111 and the back substrate 112. The spacer SP can also uniformly maintain a distance between the front substrate 111 and the back substrate 112. Namely, the spacer SP can uniformly maintain a thickness of the liquid crystal layer LC filled in the display panel 110. Hence, the spacer SP improves the structural stability of the display panel 110.

In addition, the front substrate 111 includes a plurality of TFTs formed on the front substrate 111. The TFTs can be arranged on the front substrate 111 in a matrix form and can be formed on a portion or the entire surface of the front substrate 111. The electrode line EL is electrically connected to the TFT and can be exposed to the outside of the display panel 110 due to a difference between the lengths of the front substrate 111 and the back substrate 112.

Further, the front substrate 111 includes switching elements corresponding to the TFTs. The switching element switch on or off a pixel electrode. For example, the pixel electrode can change an arrangement of molecules of the liquid crystal layer LC in response to a control signal received from the outside. The liquid crystal layer LC includes a plurality of liquid crystal molecules, and the arrangement of the liquid crystal molecules change depending on a voltage difference between the pixel electrode and a common electrode. The liquid crystal layer LC also transfers light provided by the backlight unit 120 to the front substrate 111.

In addition, the front substrate 111 includes the cover layer BM in which the cover layer BM is positioned between the TFT and the front substrate 111. The cover layer BM can also contact the TFT. The cover layer BM can be formed on a back surface of the front substrate 111, and the TFT can be formed on the cover layer BM. Further, the cover layer BM can overlap the TFT. Namely, the cover layer BM can cover the TFT when viewed from a front surface of the display panel 110. For example, the cover layer BM can be black.

As discussed above, the display panel 110 includes an active area AA and an inactive area DA. The active area AA is an area, on which an image is displayed, and the inactive area DA is an area, on which the image is not displayed. An electrode 115 can be electrically connected to the electrode line EL and is positioned in the inactive area DA. The electrode 115 can be bonded to the electrode line EL, which is exposed to the outside of the display panel 110 due to a difference between the lengths of the front substrate 111 and the back substrate 112, and can be electrically connected to the TFT. Further, the electrode 115 can be a pad electrode.

Figure 10A:
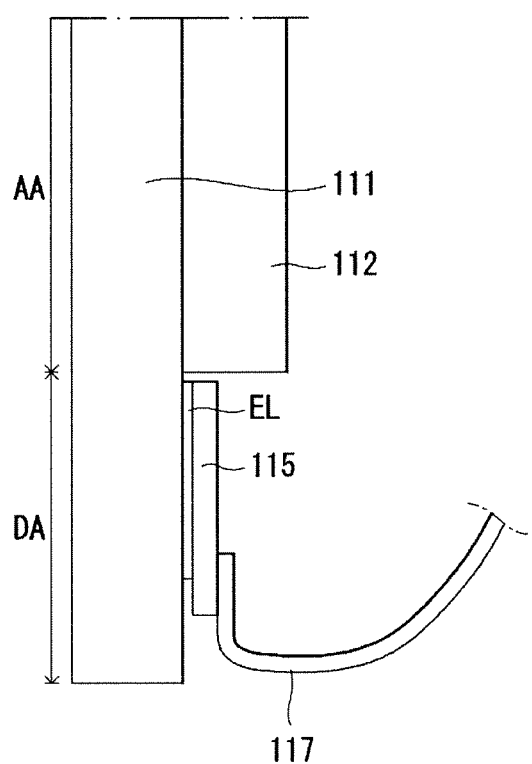

Referring to FIG. 10A, the member layer 117 is electrically connected to the electrode 115. Namely, the electrode 115 can be electrically connected to the electrode line EL, and the member layer 117 can be bonded to the electrode 115 and electrically connected to the electrode 115. The member layer 117 bends toward the rear of the back substrate 112 and can be extended toward the main board 321, the timing controller board 319, or the power supply board 315, which are positioned in the rear of the back substrate 112. In addition, the member layer 117 can be extended on the inactive area DA because the length of the front substrate 111 is longer than the length of the back substrate 112. Namely, a configuration or a length of the display panel 110 includes a sum of a length of the active area AA and a length of the inactive area DA. Also, the electrode 115 and the member layer 117 can be connected to each other within a range less than the length of the display panel 110 described with reference to FIGS. 5 to 7. This leads to a reduction in a bezel.

The member layer 117 can also be connected to one side surface, one side, or one edge of the display panel 110, so that a source PCB is connected to the TFT line. The connection between the member layer 117 and the display panel 110 may require the bezel to be formed on one side of the display panel 110. The configuration of the display panel 110 described with reference to FIGS. 8 to 10 is such that the source PCB is connected to the TFT line, and the bezel formed by the connection is removed or minimized its size.

Figure 10B:
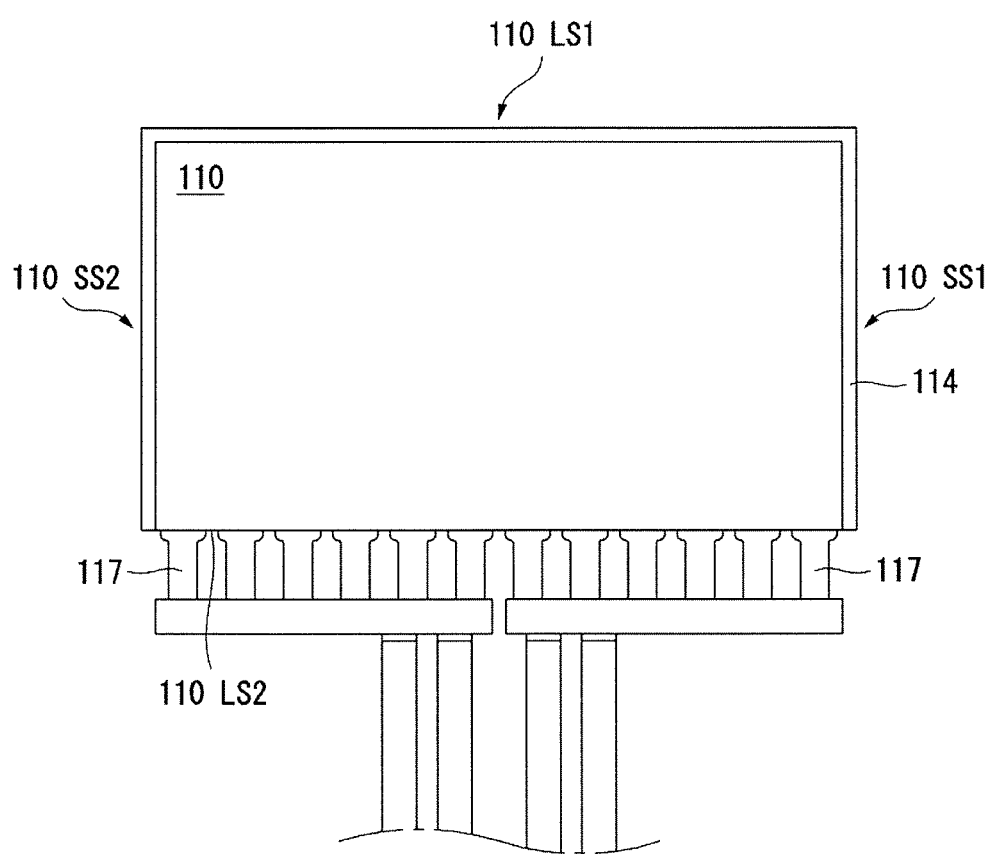

Referring to FIG. 10B, a panel cover 114 covers the side of the display panel 110 and can be referred to as a sealing member. The sealing member 114 is attached to the side of the display panel 110 and seals the side of the display panel 110. In this instance, the sealing member 114 can cover a first long side 110 LS1, a first short side 110 SS1, and a second short side 110 SS2 of the display panel 110. Hence, the sealing member 114 prevents the side of the display panel 110 from being polluted or damaged.

Figure 10C:
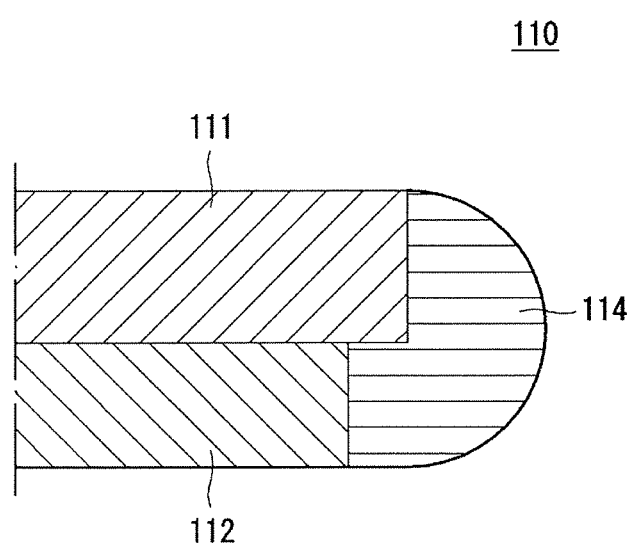

Referring to FIG. 10C, the sealing member 114 is positioned on a side of the display panel 110. As discussed above, the display panel 110 includes the first substrate 111 and the second substrate 112. The first substrate 111 can be the front substrate, and the second substrate 112 can be the back substrate. As shown, the sealing member 114 covers a side of the front substrate 111 and a side of the back substrate 112. The sealing member 114 is also attached to the side of the front substrate 111 and the side of the back substrate 112. In FIG. 10C, the side of the display panel 110 can be the first long side 110LS1, the first short side 110SS1, and/or the second short side 110SS2 shown in FIG. 10A. Namely, the side of the display panel 110 can be a side, which is not connected to the member layer 117.

Figure 10D:
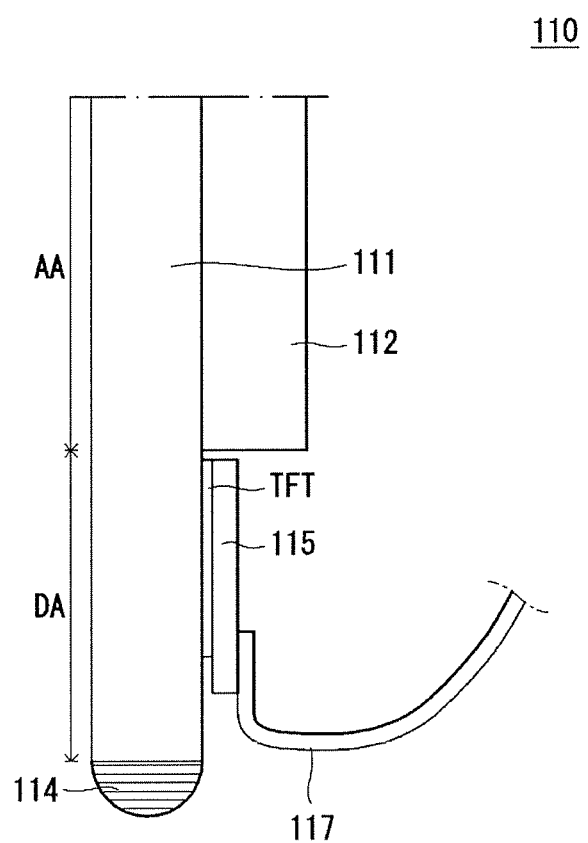

Referring to FIG. 10D, the sealing member 114 is positioned on a side of the display panel 110. As discussed above, the display panel 110 includes the first substrate 111 and the second substrate 112, and the first substrate 111 can be the front substrate, and the second substrate 112 can be the back substrate. The sealing member 114 covers a side of the front substrate 111 and is attached to the side of the front substrate 111. In FIG. 10D, the side of the display panel 110 is the second long side 110LS2 shown in FIG. 10A. Namely, the side of the display panel 110 can be a side, which is connected to the member layer 117.

Figure 11:
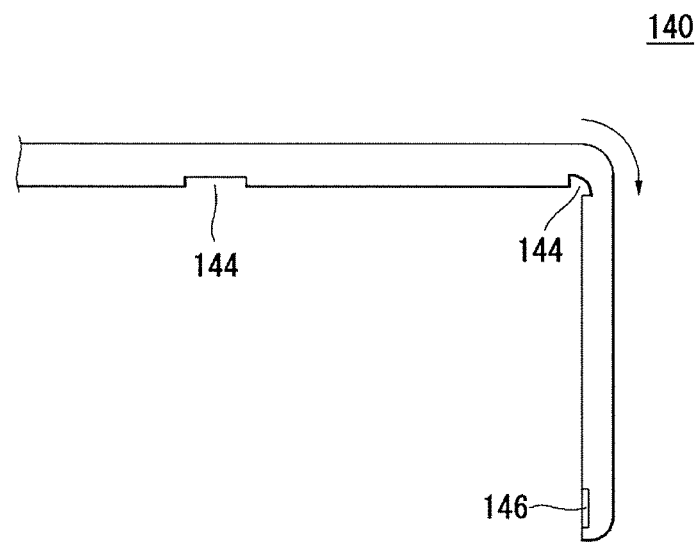
FIGS. 11 to 14 illustrate examples of a side frame according to an example embodiment of the invention.
Figure 12:
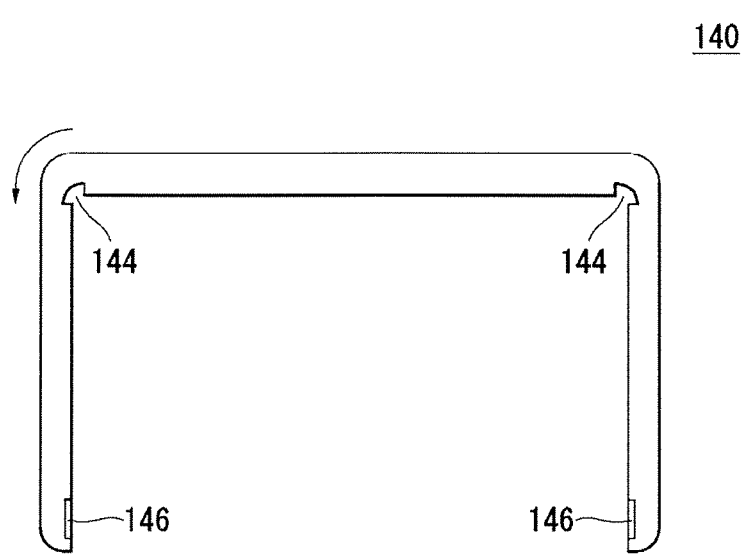
Figure 13:
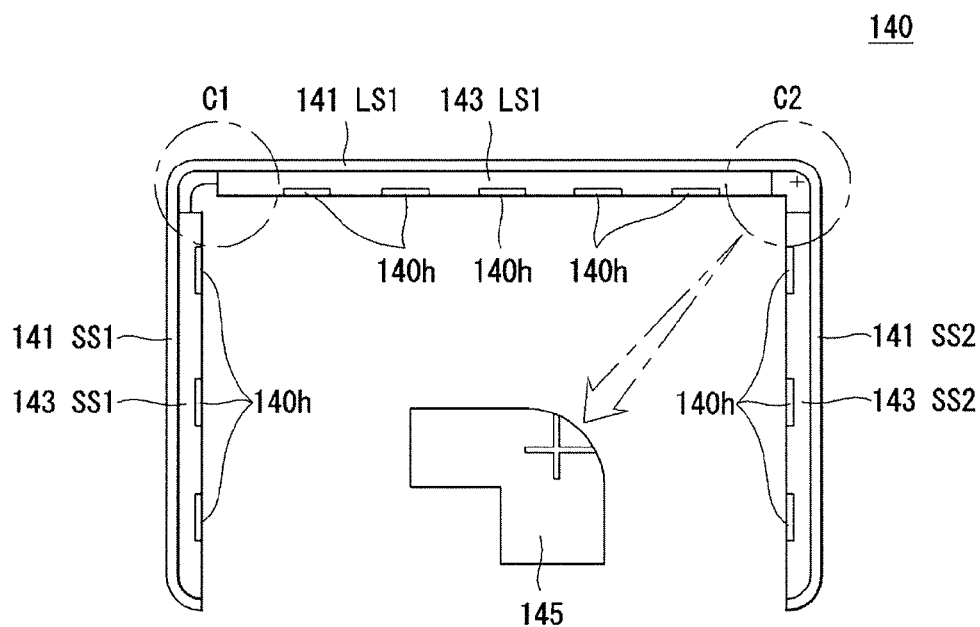
Figure 14:
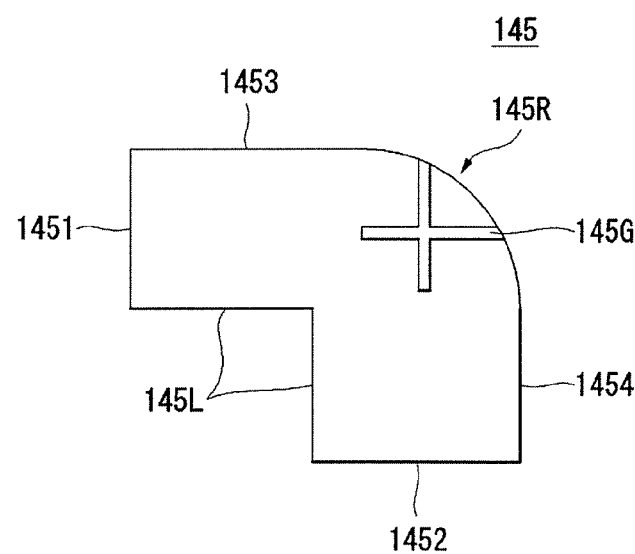

Next, FIGS. 11 to 14 illustrate examples of a side frame 140 according to an embodiment of the invention. More specifically, FIGS. 11 and 12 illustrate examples of a front surface of a side frame according to an example embodiment of the invention, FIG. 13 illustrates an example of a back surface of a side frame according to an example embodiment of the invention, and FIG. 14 illustrates an example of a reinforcement member according to an example embodiment of the invention.

Referring to FIGS. 11 and 12, the side frame 140 extends along three sides of the display panel 100 and has a symmetrical or asymmetrical cross section. The side frame 140 includes a metal material and has at least one groove 144 formed on one side of the side frame 140.

As shown, a plurality of grooves 144 can be sequentially formed on one side of the side frame 140 and to be separated from one another by a predetermined distance. Each groove 144 extends to the inside of the side frame 140.

The side frame 140 bends at a formation location of the groove 144. The side frame 140 can be formed in ⌐-shape or a ∟-shape through the bending. The side frame 140 may entirely have a ⊏-shape. In addition, a groove 146 can be formed at one end or both ends of the side frame 140. The groove 146 can be formed on a front surface of the side frame 140. Further, the side frame 140 can be formed through the bending, or can be formed by coupling separate frames.

Referring to FIG. 13, the side frame 140 includes an outer frame 141 and an inner frame 143. The outer frame 141 forms an outer perimeter of the side frame 140 and can form the first long side LS1, the first short side SS1, and the second short side SS2 of the display device 100. The outer frame 141 can also be formed as one body, or can be formed by coupling separate frames.

The inner frame 143 is connected to the outer frame 141 and extends from the outer frame 141. The inner frame 143 can be a plurality of inner frames. The inner frame 143 can be formed as one body along with the outer frame 141, or can be formed separately from the outer frame 141 and then can be coupled with the outer frame 141. As shown, the inner frame 143 includes a first inner frame 143 LS1, a second inner frame 143 SS1, and a third inner frame 143 SS2. The inner frame 143 and the outer frame 141 may have different heights. A height difference between the inner frame 143 and the outer frame 141 forms (or makes) a step or a stepped portion. The height difference may decrease as it goes from the outer frame 141 to the inner frame 143.

The first inner frame 143LS1 extends from an outer frame 141 LS1 of the first long side LS1 to the inside of the side frame 140. In this instance, the first inner frame 143 LS1 can be a flat extended plate. The second inner frame 143 SS1 extends from an outer frame 141 SS1 of the first short side SS1 to the inside of the side frame 140. In this instance, the second inner frame 143 SS1 can be a flat extended plate. In addition, the third inner frame 143 SS2 extends from an outer frame 141 SS2 of the second short side SS2 to the inside of the side frame 140. In this instance, the third inner frame 143 SS2 can be a flat extended plate. The outer frame 141 can entirely form an outer shape of the side frame 140, and the inner frame 143 can be connected to the outer frame 141 and provide a support force for the components of the display device 100.

Further, a reinforcement member 145 is positioned at a first corner C1 and/or a second corner C2. The reinforcement member 145 is positioned adjacent to the first corner C1 inside the outer frame 141. The reinforcement member 145 is positioned between the outer frame 141, the second inner frame 143 SS1 of the first short side SS1, and the first inner frame 143 LS1 of the first long side LS1. The reinforcement member 145 can also contact the outer frame 141, the second inner frame 143 SS1, or the first inner frame 143 LS1. The reinforcement member 145 also provides rigidity for the side frame 140, so that the bending of the side frame 140 is maintained. The configuration of the reinforcement member 145 adjacent to the first corner C1 can be equally applied to a reinforcement member 145 positioned adjacent to the second corner C2.

In addition, as shown, the inner frame 143 includes a plurality of grooves 140*h*. For example, the inner frame 143 LS1 of the first long side LS1 can have five grooves 140*h* sequentially formed on the inner frame 143 LS1 of the first long side LS1. The five grooves 140*h* are positioned at regular intervals or at irregular intervals. In another embodiment, the inner frame 143 SS1 or 143 SS2 of the first or second short side can have three grooves 140*h* sequentially formed on the inner frame 143 SS1 of the first short side SS1 at regular intervals.

Referring to FIG. 14, the reinforcement member 145 includes a straight portion 145L and a round portion 145R. The straight portion 145L forms an inside of the reinforcement member 145 and improves the support rigidity of the reinforcement member 145. The round portion 145R forms an outside of the reinforcement member 145 and is formed along curvature of the bending of the side frame 140.

In addition, the reinforcement member 145 may have a gap 145G positioned adjacent to the round portion 145R. The gap 145G provides flexibility for the reinforcement member 145. The gap 145G is positioned adjacent to the round portion 145R and extends along the reinforcement member 145. The gap 145G can also extend in different directions. For example, the gap 145G can form a cross line.

One side 1451 of the reinforcement member 145 contacts the inner frame 143 LS1 of the first long side LS1, and the other side 1452 of the reinforcement member 145 contacts the inner frame 143 SS2 of the second short side. Other sides 1453 and 1454 of the reinforcement member 145 contacts the inside of the outer frame 141. Hence, the reinforcement member 145 provides the rigidity and flexibility for the side frame 140.

Figure 15:
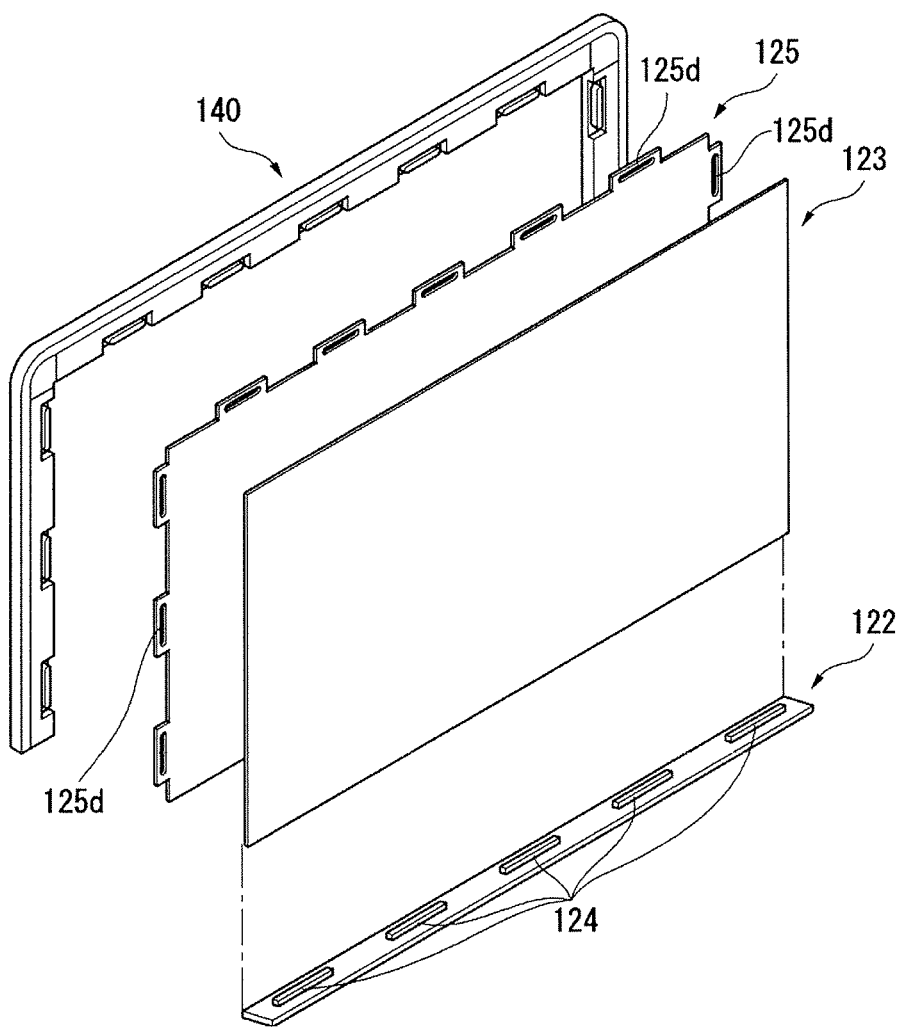
FIGS. 15 to 29 illustrate examples of assembling components of a display device according to an example embodiment of the invention.

Next, FIGS. 15 to 29 illustrate examples of assembling components of a display device according to an example embodiment of the invention. Referring to FIG. 15, an optical sheet 125 is positioned on the inside of the side frame 140 and coupled with the side frame 140. The optical sheet 125 can be coupled with the inside of the side frame 140 and inserted into the grooves 140*h* included in the side frame 140.

Further, the optical sheet 125 causes light emitted by the light sources to be uniformly transferred to the display panel 110. The optical sheet 125 may also include a plurality of layers such as at least one prism sheet and/or at least one diffusion sheet. The optical sheet 125 also includes at least one coupling portion 125*d* to be coupled with the grooves 140*h* of the side frame 140. The coupling portion 125*d* can also be formed on a first long side, a first short side, and/or a second short side of the optical sheet 125.

Further, the optical sheet 125 may include a plurality of sheets having different functions such as first to third optical sheets. The first optical sheet can function as a diffusion sheet, and the second and third optical sheets can function as a prism sheet. A number and/or a position of the diffusion sheets and the prism sheets can be changed. For example, the optical sheet 125 includes the first optical sheet as the diffusion sheet and the second optical sheet as the prism sheet.

The diffusion sheet prevents light coming from a diffusion plate from being partially concentrated and further uniformizes a diffusion of the light. In addition, the prism sheet concentrates light coming from the diffusion sheet and makes the concentrated light to be vertically incident on the display panel 110.

The coupling portion 125*d* can be formed on at least one of edges of the optical sheet 125. The coupling portion 125*d* can be formed on at least one of the first to third optical sheets. Further, the coupling portion 125*d* can be formed at an edge of the long side of the optical sheet 125. The coupling portions 125*d* formed on the first long side of the optical sheet 125 can be arranged irregularly. For example, a number and/or a position of the coupling portions 125*d* of the first long side can be different from a number and/or a position of the coupling portions 125*d* of the first or second short side.

At least one light assembly 124 can be mounted on a substrate 122 having an electrode pattern for connecting an adaptor to the light assembly 124. For example, a carbon nanotube electrode pattern for connecting the adaptor to the light assembly 124 can be formed on the substrate 122. The substrate 122 can be formed of at least one of polyethylene terephthalate (PET), glass, polycarbonate (PC), and silicon. The substrate 122 can be a printed circuit board (PCB), on which at least one light assembly 124 is mounted.

The light assembly 124 can be a light emitting diode (LED) chip or a LED package including having at least one LED chip. The light assembly 124 can also be configured as a colored LED emitting at least one of red, green, and blue light or a white LED. The colored LED includes at least one of a red LED, a green LED, and a blue LED.

A light source included in the light assembly 124 can be a COB (Chip-On-Board) type. The COB light source can be configured such that the LED chip as the light source is directly coupled with the substrate 122. Thus, a process can be simplified. Further, a resistance can be reduced, and a loss of energy resulting from heat can be reduced. Namely, the power efficiency of the light assembly 124 can increase. The COB light source can provide brighter lighting and can be implemented to be thinner and lighter than a related art light source.

Further, an optical layer 123 uniformly provides light provided by the light assembly 124 for the back surface of the display panel 110. Namely, the optical layer 123 can diffuse light provided by the light assembly 124. For example, the optical layer 123 can be a light guide plate. Light, which is provided for the optical layer 123 by the light assembly 124, can be totally reflected from the inside of the optical layer 123 and can be entirely dispersed on the optical layer 123. The optical layer 123 is positioned in the rear of the optical sheet 125. In addition, the substrate 122 and/or the light assembly 124 is positioned on one side of the optical layer 123. For example, the substrate 122 and/or the light assembly 124 is positioned on a lower side of the optical layer 123.

Figure 16:
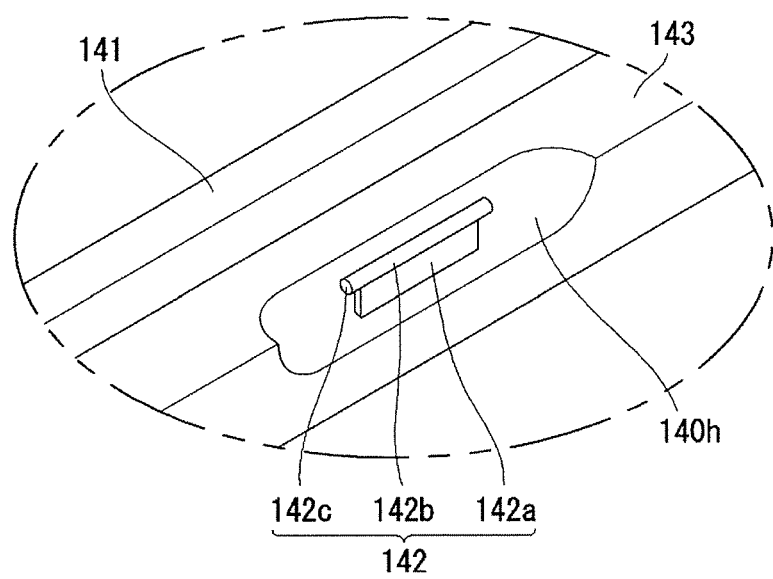
Figure 17:
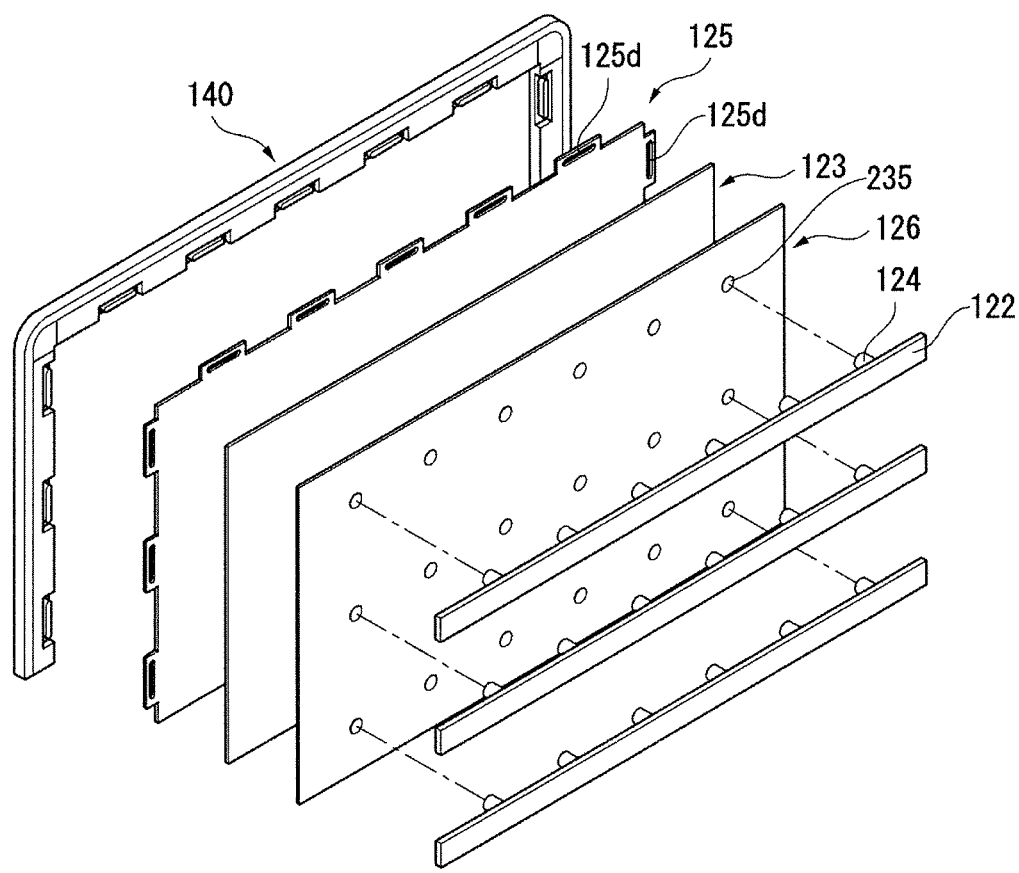

Referring to FIG. 16, a hanging portion 142 is positioned in the groove 140h of the inner frame 143. The hanging portion 142 includes a supporter 142a, a pipe 142b, and a protrusion 142c. The supporter 142a protrudes from the groove 140h of the inner frame 143 and extends. Further, a length of the supporter 142a can be substantially the same as or slightly different from a length of the coupling portion 125d of the optical sheet 125. Namely, a posture of the coupling portion 125d of the optical sheet 125 can be kept by the supporter 142a.

The pipe 142b is positioned on the supporter 142a and extends in an extension direction of the supporter 142a. A thickness of the pipe 142b can be greater than a thickness of the supporter 142a. Namely, the thickness of the pipe 142b can be greater than a width of the coupling portion 125d of the optical sheet 125. In other words, the pipe 142b prevents the coupling portion 125d of the optical sheet 125 from being detached from the supporter 142a when the coupling portion 125d of the optical sheet 125 is inserted into the supporter 142a. The protrusion 142c can also be positioned at both ends of the pipe 142b. After the coupling portion 125d of the optical sheet 125 is inserted into the supporter 142a, the protrusion 142c prevents more efficiently the optical sheet 125 from being detached from the supporter 142a Referring to FIG. 17, a reflective sheet 126 is positioned on a front surface of the substrate 122 in an area of the substrate 122 except a formation area of the light assembly 124. Namely, the reflective sheet 126 can have a plurality of holes 235.

The substrate 122 can be configured as a plurality of straps, which extend in the first direction and are separated from one another by a predetermined distance in the second direction perpendicular to the first direction. The reflective sheet 126 reflects light emitted from the light assembly 124 to the display panel 110. Further, the reflective sheet 126 again reflects light reflected from the optical layer 123.

Further, the reflective sheet 126 includes at least one of metal and metal oxide which are a reflection material. For example, the reflective sheet 126 includes metal and/or metal oxide having a high reflectance, for example, at least one of aluminum (Al), silver (Ag), gold (Au), and titanium dioxide (TiO2).

The reflective sheet 126 can also be formed by depositing and/or coating the metal or the metal oxide on the substrate 122. An ink including the metal material can be printed on the reflective sheet 126. Further, a deposition layer can be formed on the reflective sheet 126 using a heat deposition method, an evaporation method, or a vacuum deposition method such as a sputtering method. A coating layer and/or a printing layer can also be formed on the reflective sheet 126 using a printing method, a gravure coating method or a silk screen method.

Figure 18:
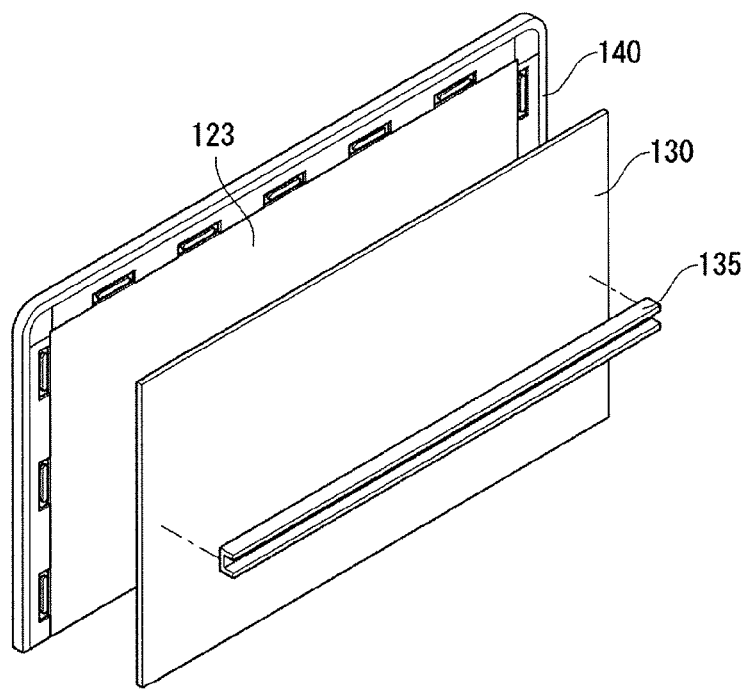

Referring to FIG. 18, the frame 130 can be coupled with the inside of the side frame 140 and fixed to a stepped portion formed by the outer frame 141 and the inner frame 143 of the side frame 140. Namely, the side of the frame 130 contacts the inside of the outer frame 141, and the front surface of the frame 130 contacts a back surface of the inner frame 143. A beam frame 135 can be coupled with a back surface of the frame 130 through a rivet or a bolt. As shown, the beam frame 135 is positioned on the back surface of the frame 130, and a portion of the back cover 150 can be fixed to the beam frame 135. Further, the power supply board 315, the main board 321, or the timing controller board 319 can be installed on the back surface of the frame 130 or in the rear of the frame 130 by the beam frame 135.

Figure 19:
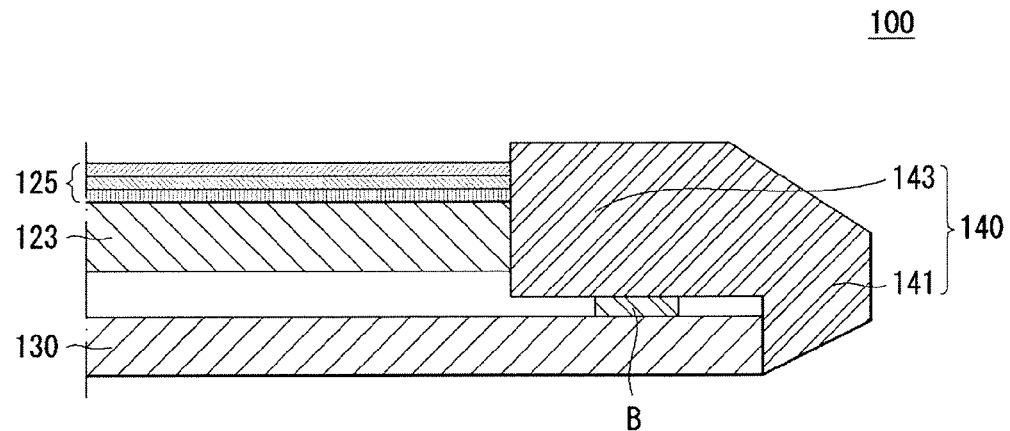

Referring to FIG. 19, the frame 130 can be coupled with the side frame 140 by being inserted into the side frame 140. The frame 130 can also be pressed in the inside of the outer frame 141. Alternatively, the frame 130 can be bonded to the side frame 140. An adhesive member B is positioned on a back surface of the inner frame 143 of the side frame 140, and the frame 130 can be coupled with the side frame 140 by the adhesive member B included in the inner frame 143.

Figure 20:
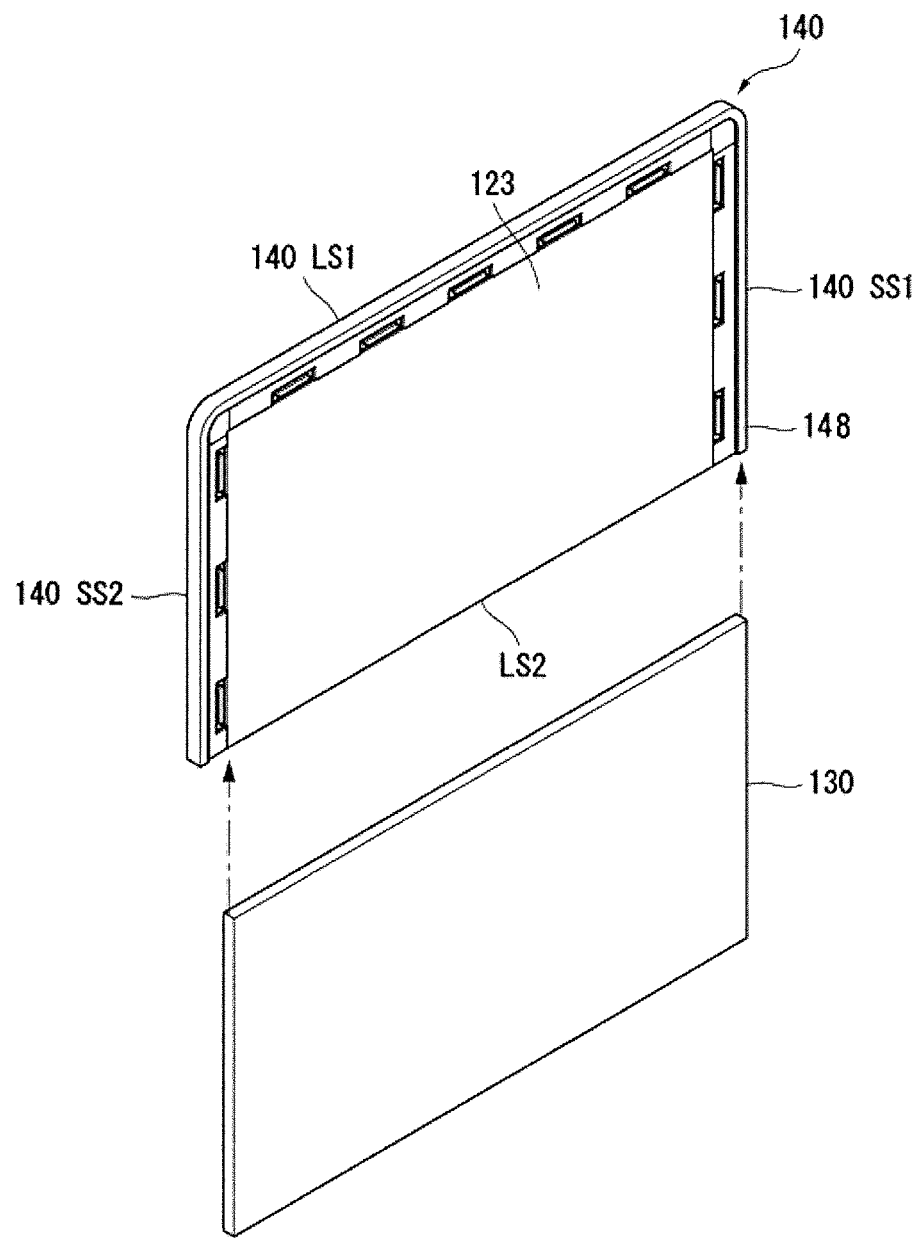

Referring to FIG. 20, the frame 130 can be coupled with the side frame 140 by sliding on the side frame 140. That is, the frame 130 can slide from the second long side LS2 of the display device 100 to a first long side 140LS1 of the side frame 140 along a first short side 140SS1 and a second short side 140SS2 of the side frame 140. For this, the side frame 140 includes a coupling guide 148.

Figure 21:
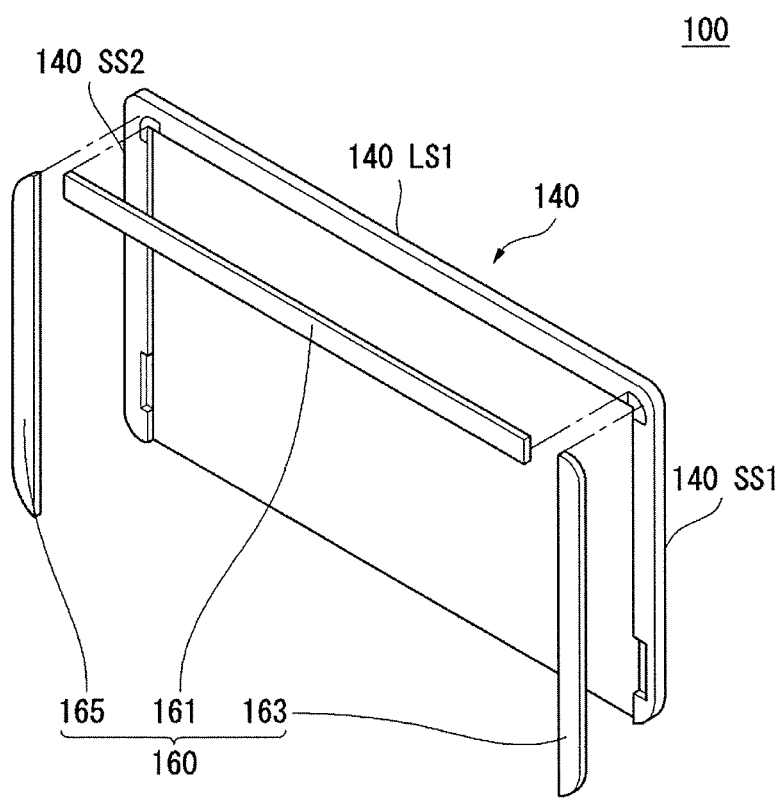

Referring to FIG. 21, an adhesive member 160 is positioned and attached to the front surface of the side frame 140. The adhesive member 160 can also be positioned throughout the front surface of the side frame 140. For example, the adhesive member 160 can be a double-sided tape. A first adhesive member 161 can be attached to the first long side 140LS1 of the front surface of the side frame 140, a second adhesive member 163 can be attached to the first short side 140SS1 of the front surface of the side frame 140, and a third adhesive member 165 can be attached to the second short side 140SS2 of the front surface of the side frame 140. Namely, a portion of the front surface or the entire front surface of the side frame 140 can be the adhesive member 160.

Figure 22:
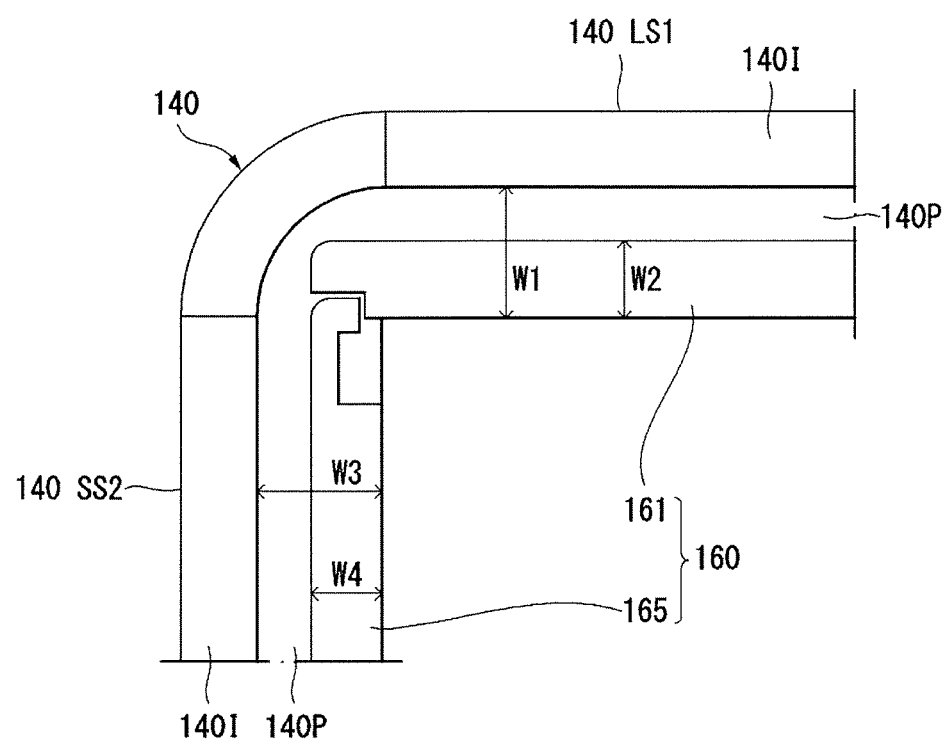

Referring to FIG. 22, the side frame 140 includes a flat portion 140P and an inclined portion 140I. The flat portion 140P forms the front surface of the side frame 140 and forms the inside of the side frame 140, and the inclined portion 140I forms a perimeter of the side frame 140. The adhesive member 160 is positioned on the front surface of the side frame 140 and on the flat portion 140P of the side frame 140.

Further, the first adhesive member 161 can be attached to the flat portion 140P positioned on the first long side 140LS1 of the side frame 140. A width W2 of the first adhesive member 161 can be less than a width W1 of the flat portion 140P positioned on the first long side 140LS1. In addition, the third adhesive member 165 can be attached to the flat portion 140P positioned on the second short side 140SS2 of the side frame 140. A width W4 of the third adhesive member 165 can be less than a width W3 of the flat portion 140P positioned on the second short side 140SS2. Namely, a width of the adhesive member 160 can be within a range of a width of the flat portion 140P of the side frame 140.

Figure 23:
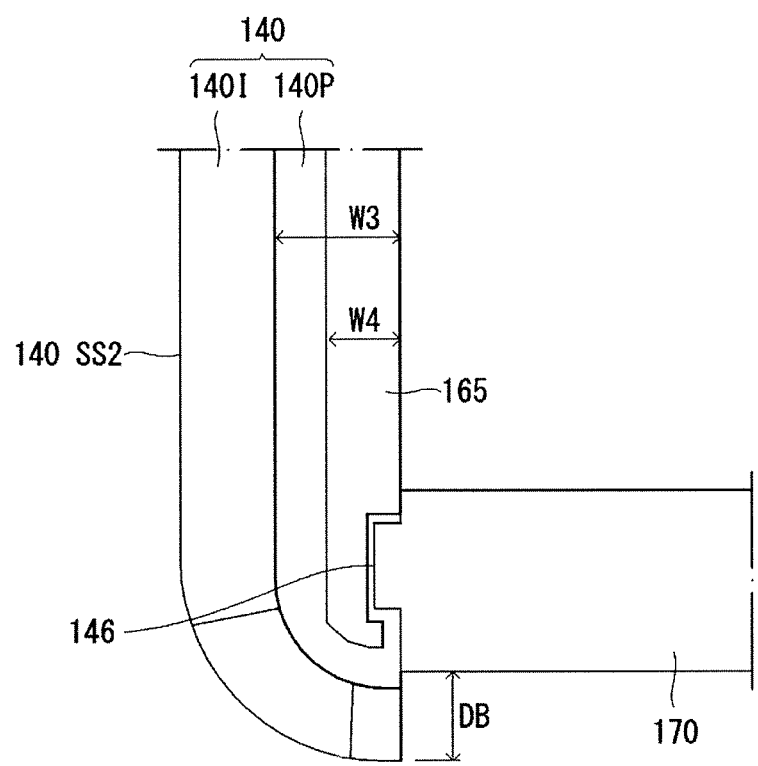
Figure 24:
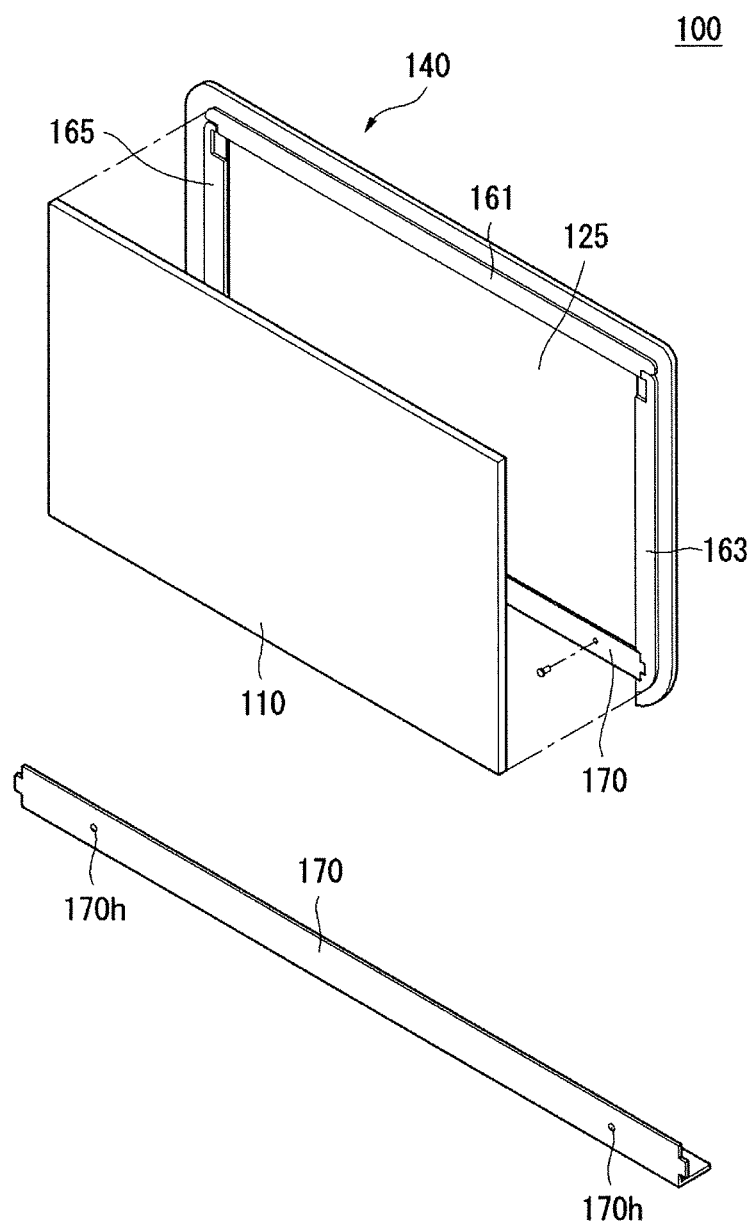

Referring to FIGS. 23 and 24, a bracket 170 can be coupled with a groove 146 of the side frame 140. One end of the bracket 170 can be inserted into a groove 146 formed at one end of the second short side 140SS2 of the side frame 140. The bracket 170 can also be separated from one end of the side frame 140 by a predetermined distance DB and coupled with the frame 130 through a bolt.

The display panel 110 can be coupled with the front surface of the side frame 140 and fixed to the front surface of the side frame 140. Further, the display panel 110 can be attached and fixed to the front surface of the side frame 140 through the adhesive members 161, 163, and 165.

Namely, the display panel 110 can be coupled with the side frame 140 at the outside of the side frame 140. Hence, all of the sides of the display panel 110 can be exposed to the outside.

Further, the back surface of the display panel 110 may not be observed from the outside due to the side frame 140 and/or the frame 130. Also, the front surface and the side surface of the display panel 110 can be observed from the outside. Namely, the display panel 110 is positioned on the outside of the side frame 140 and/or the frame 130.

Figure 25:
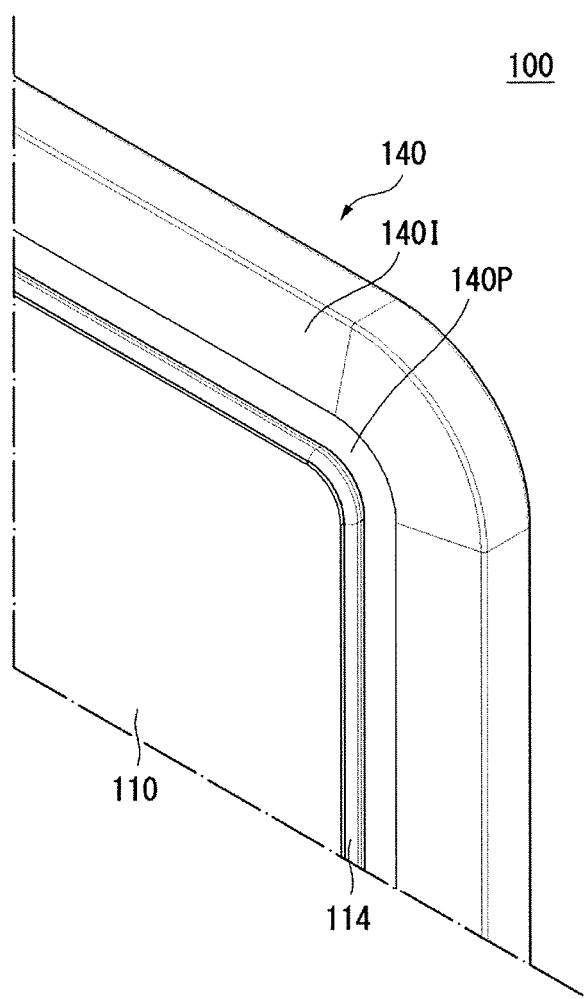

Referring to FIG. 25, a panel cover 114 is positioned on the side of the display panel 110 covers and covers the side of the display panel 110. The panel cover 114 can be fixed to the side of the display panel 110. The panel cover 114 can be inserted into a perimeter of the side of the display panel 110 and attached to the perimeter of the side of the display panel 110. For example, the panel cover 114 can be formed of synthetic resin including an elastic material. Hence, the panel cover 114 prevents the side of the display panel 110 from being damaged by an external force or an external impact. As discussed above, the panel cover 114 can be referred to as a sealing member.

Figure 26:
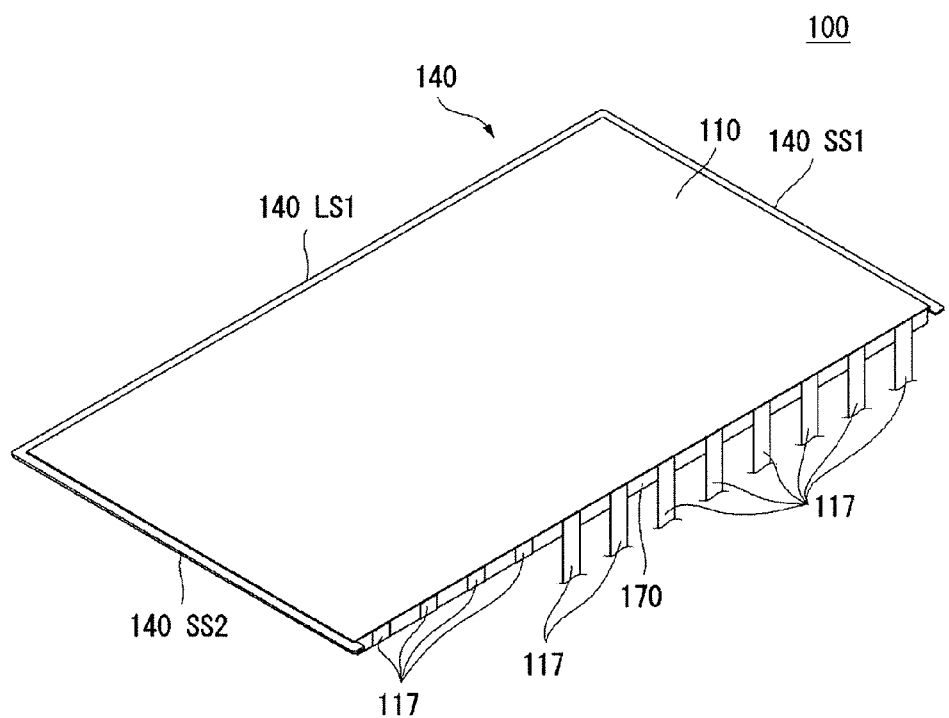

Referring to FIG. 26, a member layer 117 can extend from the display panel 110. For example, the member layer 117 can be a FPCB. The plurality of member layers 117 can also extend from the display panel 110. For example, as shown in FIG. 26, twelve member layers 117 can extend from the side of the display panel 110, cover the bracket 170, and face toward the rear of the display device 100. The member layer 117 can also extend from the side of the display panel 110 and extend while covering the bracket 170. The member layer 117 can also cover one surface of the bracket 170. The member layer 117 covers the bracket 170 and extend toward the rear or the back surface of the display device 100.

Figure 27:
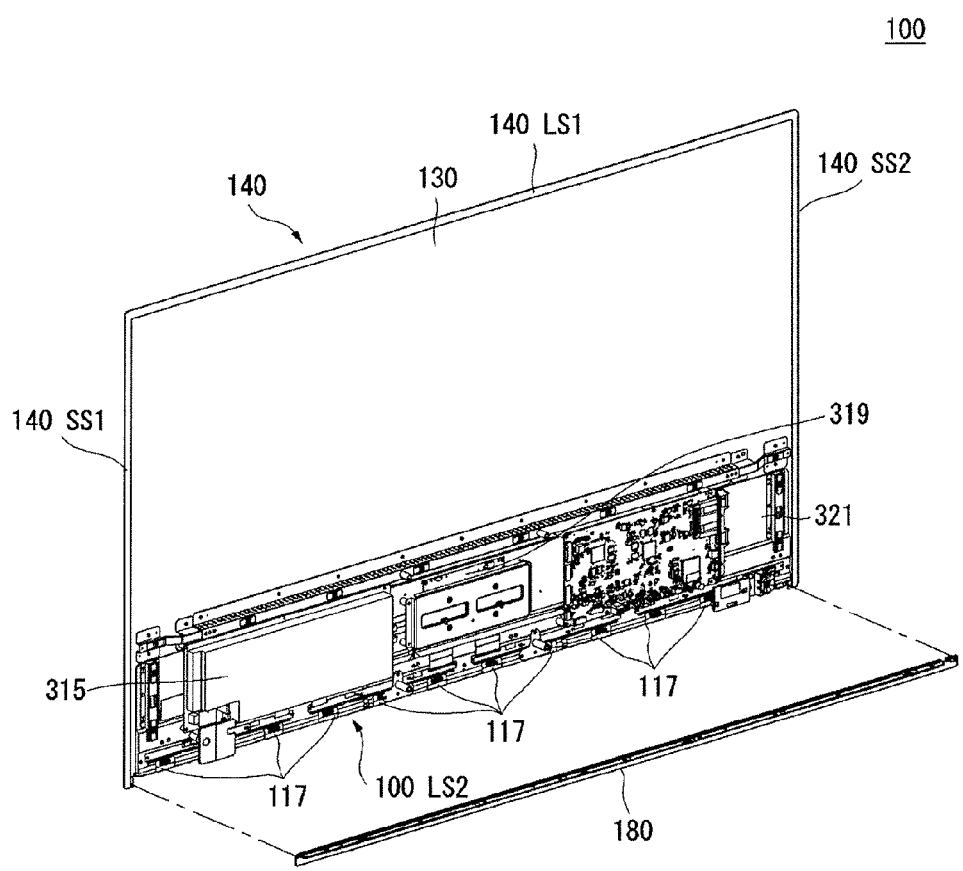

Referring to FIG. 27, a bottom frame 180 is positioned on the second long side LS2 of the display device 100. For example, the bottom frame 180 can be installed on a lower part of the display device 100 and positioned on a lower side of the display panel 110. The bottom frame 180 is positioned adjacent to a lower surface of the display panel 110 and covers the lower surface of the display panel 110. Further, the bottom frame 180 can be coupled with the side frame 140. For example, both ends of the bottom frame 180 can be connected to the side frame 140 and fixed to both lower ends of the side frame 140. The bottom frame 180 also covers the member layer 117 extended from the display panel 110. Namely, the member layer 117 is positioned between the lower side of the display panel 110 and the bottom frame 180.

Figure 28:
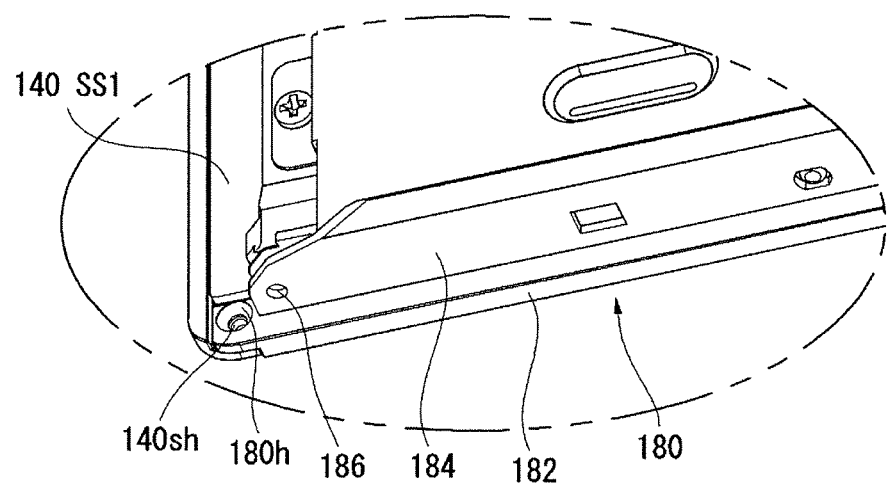

Referring to FIG. 28, the bottom frame 180 includes a front frame 182 and a back frame 184. The front frame 182 covers the front surface and/or an upper surface of the display device 100, and the back frame 184 covers the back surface and/or a lower surface of the display device 100. The front frame 182 can include a hole 180h at its both ends. The front frame 182 can be referred to as a vertical frame, and the back frame 184 can be referred to as a horizontal frame. Further, the front frame 182 can form an entire horizontal surface of the bottom frame 180, and the back frame 184 can form an entire vertical surface of the bottom frame 180.

The front frame 182 can be coupled with the side frame 140 and coupled with both lower ends of the side frame 140. The side frame 140 includes a hole 140sh at both lower ends matched to the hole 140sh of the side frame 140. Further, the bottom frame 180 can be coupled with the side frame 140 by inserting a screw into the hole 180h of the front frame 182 and the hole 140sh of the side frame 140. The back frame 184 also includes a hole 186 at one end or both ends.

Figure 29:
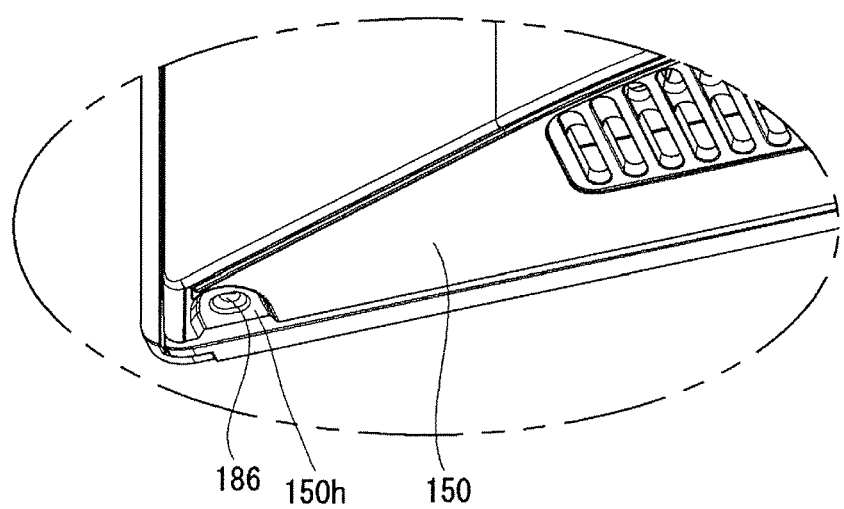

Referring to FIG. 29, the back cover 150 is positioned in the rear of the display device 100 and coupled with the back surface of the frame 130. The back cover 150 can be coupled with and fixed to the bottom frame 180. The back cover 150 may have a hole 150h at its both ends. The hole 150h of the back cover 150 can be matched to the hole 186 of the back frame 184. The back cover 150 can be fixed to the bottom frame 180 by inserting a screw into the hole 150h of the back cover 150 and the hole 186 of the back frame 184.

Figure 30:
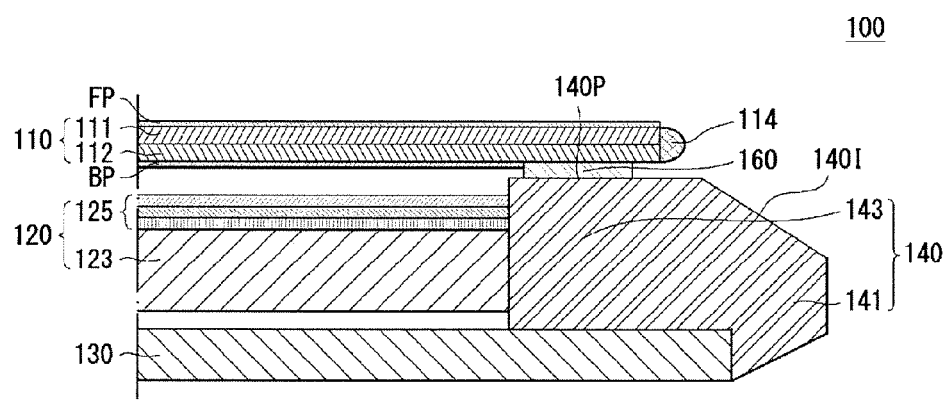
FIGS. 30 to 39 illustrate examples of a cross section of a display device according to an example embodiment of the invention.

Next, FIGS. 30 to 39 illustrate examples of a cross section of a display device according to an embodiment of the invention. Referring to FIG. 30, the side frame 140 is positioned on one side of the main frame 130 such as being positioned adjacent to the side of the main frame 130. An outer frame 141 contacts the side of the main frame 130, an inner frame 143 is positioned adjacent to an edge of a front surface of the main frame 130, and a stepped portion is formed by the outer frame 141 and the inner frame 143. As shown, the main frame 30 can be coupled, seated or received via the stepped portion.

The side frame 140 includes a flat portion 140P and an inclined portion 140I. The flat portion 140P is positioned on the inside of the front surface of the side frame 140. The inclined portion 140I is connected from the flat portion 140P to the outside of the side frame 140 and positioned on the outside of the side frame 140.

Further, an adhesive member 160 is positioned and fixed on the front surface of the side frame 140. The adhesive member 160 is thus fixed to the flat portion 140P. In addition, the display panel 110 can be placed on the adhesive member 160 and fixed to the side frame 140 through the adhesive member 160. The display panel 110 is also fixed to the front surface of the side frame 140 through the adhesive member 160.

Further, the display panel 110 includes the front substrate 111 and the back substrate 112 in which the front substrate 111 is positioned opposite the back substrate 112. In addition, the display panel 110 includes a polarization layer on its front surface or back surface. For example, the display panel 110 includes a first polarization layer FP and a second polarization layer BP. The first polarization layer FP covers the front substrate 111, and the second polarization layer BP covers the back substrate 112.

The side of the display panel 110 is exposed to the outside and positioned on the outside of the side frame 140. Further, the panel cover 114 covers the exposed side of the display panel 110.

In addition, the backlight unit 120 is positioned between the display panel 110 and the main frame 130 and positioned on the inside of the side frame 140. The backlight unit 120 is thus positioned between the display panel 110, the main frame 130, and the side frame 140. As shown, the backlight unit 120 includes an optical layer 123 and an optical sheet 125. The optical layer 123 is positioned adjacent to the main frame 130, and the optical sheet 125 is positioned adjacent to the display panel 110. Further, the optical layer 123 is positioned between the main frame 130 and the display panel 110, and the optical sheet 125 is positioned between the optical layer 123 and the display panel 110. As shown, the main frame 30 can be coupled, seated or received via the stepped portion.

Figure 31:
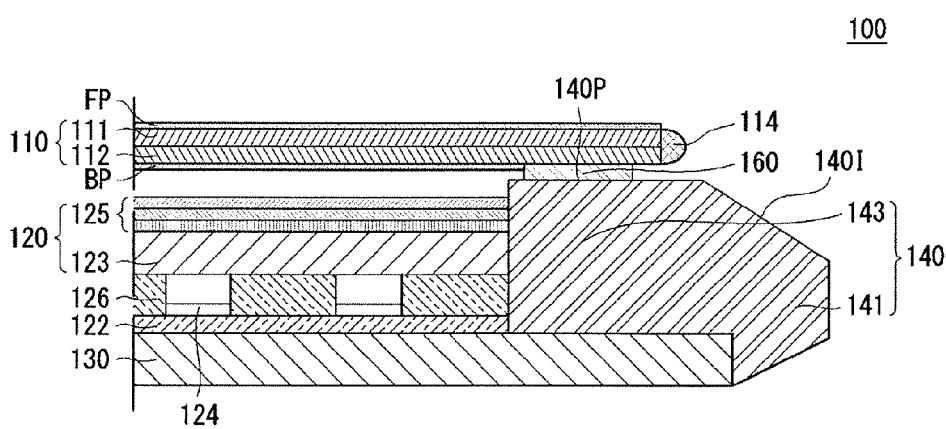

Referring to FIG. 31, a side frame 140 is positioned on one side of a main frame 130 and positioned adjacent to the side of the main frame 130. An outer frame 141 contacts the side of the main frame 130 and an inner frame 143 is positioned adjacent to an edge of a front surface of the main frame 130. A stepped portion is also formed by the outer frame 141 and the inner frame 143.

Further, the side frame 140 includes a flat portion 140P and an inclined portion 140I. The flat portion 140P is formed on a front surface of the side frame 140 and is positioned on the inside of the front surface of the side frame 140. Also, the inclined portion 140I can be connected from the flat portion 140P to the outside of the side frame 140 and positioned on the outside of the side frame 140.

An adhesive member 160 is also positioned on the front surface of the side frame 140 and fixed to the front surface of the side frame 140. The adhesive member 160 can be fixed to the flat portion 140P and the display panel 110 can be placed on the adhesive member 160. The display panel 110 can also be fixed to the side frame 140 and fixed to the front surface of the side frame 140 through the adhesive member 160.

Further, the display panel 110 includes the front substrate 111 and the back substrate 112. The front substrate 111 is positioned opposite the back substrate 112. In addition, the display panel 110 includes a polarization layer on its front surface or back surface such as a first polarization layer FP and a second polarization layer BP. In addition, the first polarization layer FP covers the front substrate 111, and the second polarization layer BP covers the back substrate 112.

The side of the display panel 110 can be exposed to the outside and positioned on the outside of the side frame 140. The panel cover 114 covers the exposed side of the display panel 110 such that the exposed side of the display panel 110 can be covered by the panel cover 114.

In addition, the backlight unit 120 is positioned between the display panel 110 and the main frame 130. The backlight unit 120 can also be positioned on the inside of the side frame 140 and positioned between the display panel 110, the main frame 130, and the side frame 140. The backlight unit 120 includes a reflective sheet 126, an optical layer 123, an optical sheet 125, a substrate 122, and a light assembly 124.

The substrate 122 is positioned adjacent to and on a front surface of the main frame 130. The substrate 122 contacts the front surface of the main frame 130 and the light assembly 124 can be mounted on the substrate 122. The plurality of light assemblies 124 are also mounted on the substrate 122.

Further, the reflective sheet 126 can be placed on the substrate 122, and the light assembly 124 is positioned on the inside of the reflective sheet 126. The light assembly 124 mounted on the substrate 122 can be inserted into the inside of the reflective sheet 126.

Further, the optical layer 123 is positioned between the reflective sheet 126 and the optical sheet 125, and the optical sheet 125 is positioned adjacent to the display panel 110. The optical layer 123 can also be positioned between the reflective sheet 126 and the display panel 110, and the optical sheet 125 is positioned between the optical layer 123 and the display panel 110.

Figure 32:
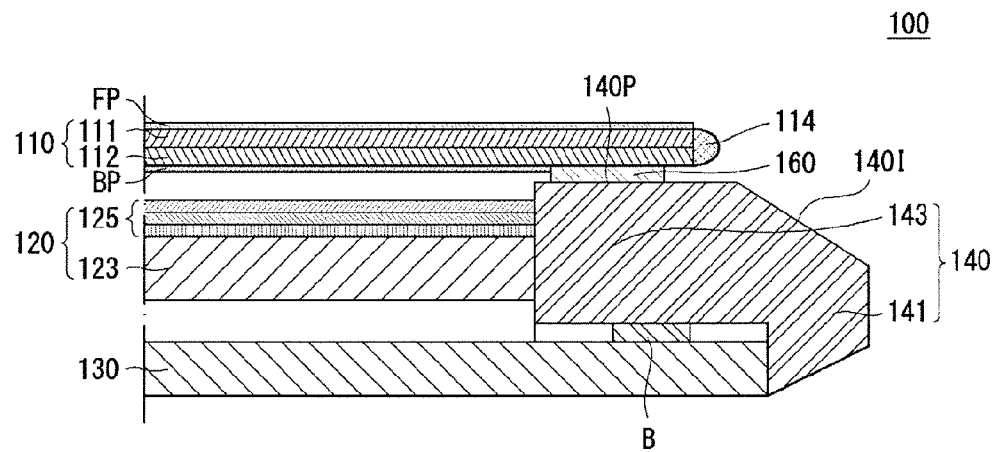
Figure 33:
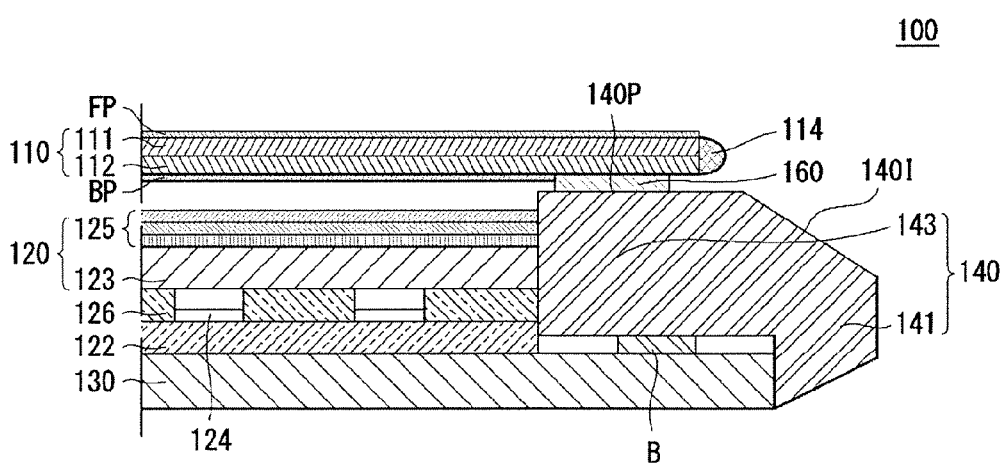

Referring to FIGS. 32 and 33, a main frame 130 can be bonded to a side frame 140. For example, an adhesive member B can be fixed to a back surface of the side frame 140, and the main frame 130 can be fixed to the adhesive member B. The main frame 130 can be pressed in the side frame 140 and can be bonded to the side frame 140.

Figure 34:
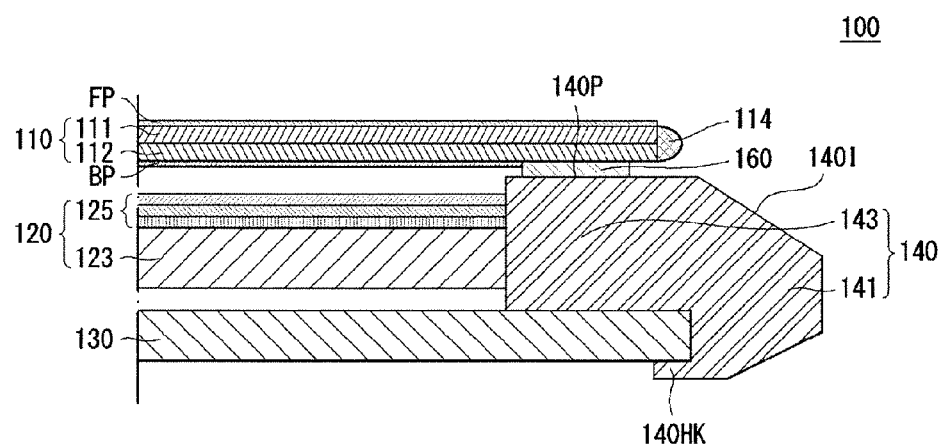
Figure 35:
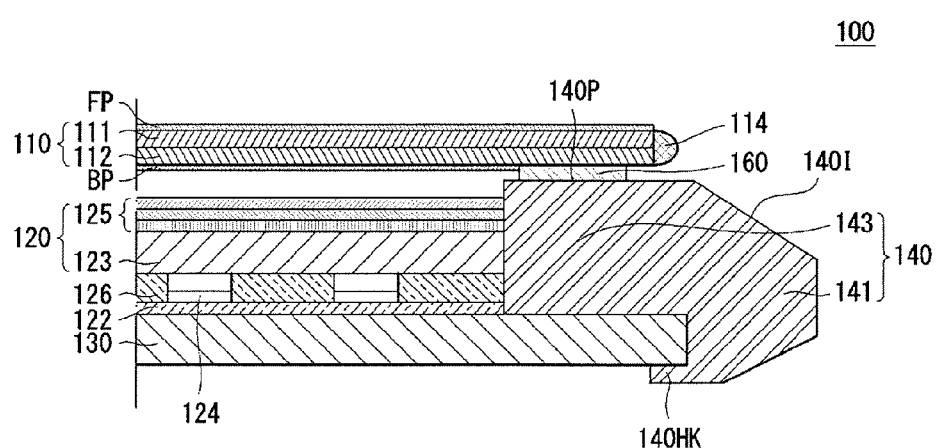

Referring to FIGS. 34 and 35, the side frame 140 may have a coupling protrusion 140HK protruding toward the inside of the side frame 140. The coupling protrusion 140HK can protrude from a back surface of the side frame 140 to the inside of the side frame 140, be adjacent to an edge of a back surface of the main frame 130 and be positioned at the side frame 140. The coupling protrusion 140HK also extends along a longitudinal direction of the side frame 140. Hence, the main frame 130 can be inserted into the side frame 140.

An outer frame 141 may have a coupling protrusion 140HK protruding toward the inside of the outer frame 141 or the inside of the side frame 140. The coupling protrusion 140HK can be adjacent to the edge of the back surface of the main frame 130 and be positioned at the outer frame 141. The coupling protrusion 140HK also extends along a longitudinal direction of the outer frame 141.

Figure 36:
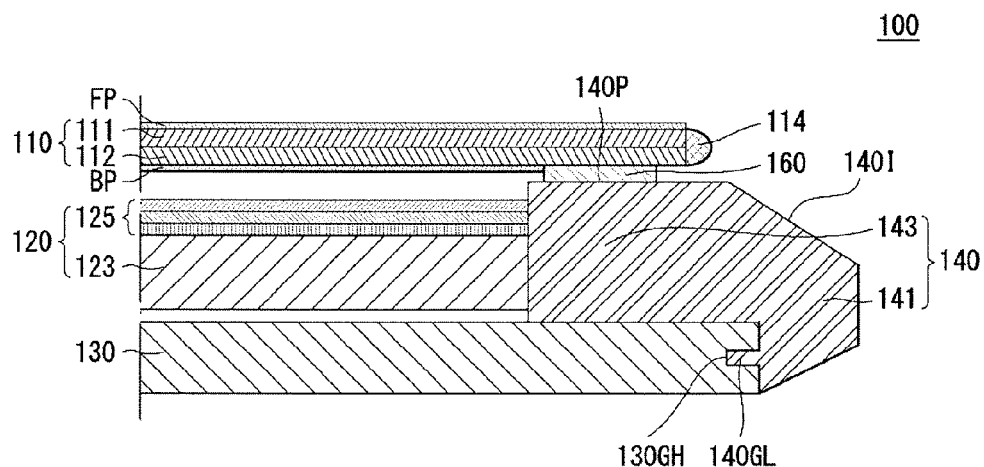
Figure 37:
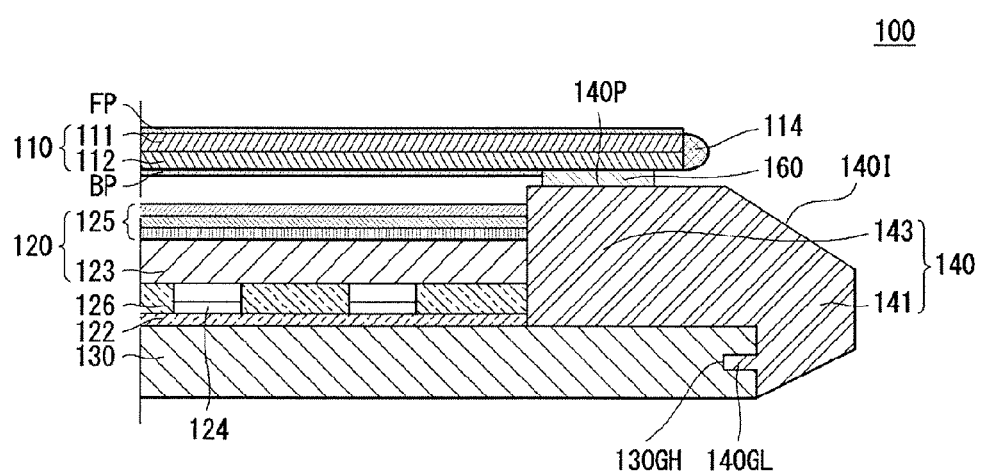

Referring to FIGS. 36 and 37, the side frame 140 may have a guide protrusion 140GL protruding toward the inside of the side frame 140. The guide protrusion 140GL protrudes along the longitudinal direction of the side frame 140, protrudes toward the inside of the outer frame 141 and is positioned in parallel with the inner frame 143.

The main frame 130 may have a guide groove 130GL. In more detail, the guide groove 130GL can be formed by depressing the side of the main frame 130. The guide groove 130GL can extend along the longitudinal direction of the side frame 140, can be formed on the inside of the outer frame 141 and can extend along an extension direction of the outer frame 141 at the inside of the outer frame 141. The guide protrusion 140GL can be inserted into the guide groove 130GL. Hence, the main frame 130 can be inserted into the side frame 140.

Figure 38:
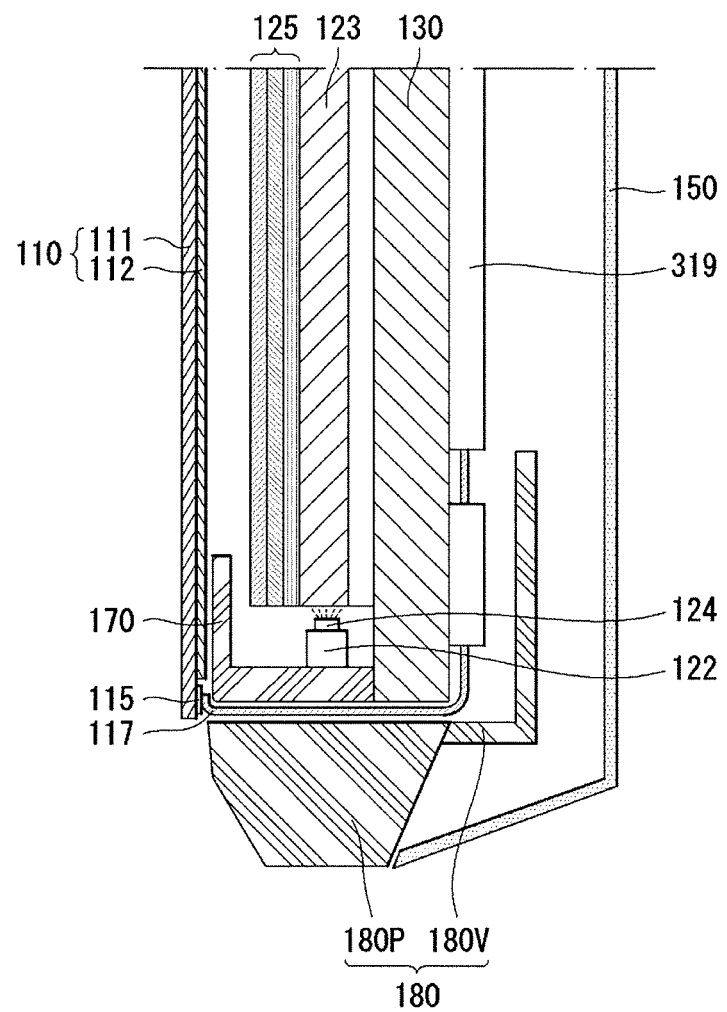

Referring to FIG. 38, a controller or a timing controller board 319 included in a controller can be installed in the rear of the main frame 130. A bracket 170 can be coupled with a lower part or a lower side of the main frame 130 and can be coupled with a front surface of the lower part of the main frame 130. The bracket 170 can also be coupled with a lower end of the main frame 130.

An optical layer 123 is positioned in front of the main frame 130 and an optical sheet 125 is positioned in front of the optical layer 123. The optical sheet 125 is positioned on a front surface of the optical layer 123. A light assembly 124 can also be positioned under the optical layer 123 and the light assembly 124 is positioned adjacent to a lower surface of the optical layer 123. Further, the light assembly 124 provides light for the lower surface of the optical layer 123. Also, the optical layer 123 and/or the optical sheet 125 make light provided by the light assembly 124 travel towards the display panel 110. The light assembly 124 is also mounted on a substrate 122.

In addition, the display panel 110 is positioned in front and an upper side, a lower side, and left and right sides of the display panel 110 can be exposed to the outside. As discussed above, the display panel 110 includes the front substrate 111 and the back substrate 112. An area of the front substrate 111 can be greater than an area of the back substrate 112. In addition, the back substrate 112 can cover a back surface of the front substrate 111 and expose a portion of the front substrate 111 to the outside. An electrode 115 can also be formed on the exposed portion of the front substrate 111. The electrode 115 is electrically connected to an electrode line EL formed on the front substrate 111.

Further, a member layer 117 can be electrically connected to the electrode 115, contact the electrode 115 and extend from the electrode 115 toward the rear of the main frame 130. In addition, the member layer 117 is positioned adjacent to a lower surface of the bracket 170, surrounds a portion of the lower surface of the bracket 170 and extends toward the rear of the main frame 130. Further, the member layer 117 covers a portion of the lower surface of the bracket 170 and is electrically connected to the controller, for example, the timing controller board 319.

In addition, the bottom frame 180 forms a lower part of the display device 100 and is positioned under the bracket 170. In more detail, the bottom frame 180 is positioned opposite a lower surface of the bracket 170 and under the main frame 130. The bottom frame 180 also covers the member layer 117 and includes a horizontal portion 180P and a vertical portion 180V. The horizontal portion 180P is positioned at a lower end of the main frame 130 and is positioned adjacent to the lower surface of the bracket 170.

Further, the horizontal portion 180P covers the member layer 117 and protects the display device 100 from an impact which can be generated in the lower part of the display device 100. The vertical portion 180V is positioned in the rear of the main frame 130. More specifically, the vertical portion 180V is positioned in the rear of the main frame 130 by extending from the horizontal portion 180P and bending. The vertical portion 180V covers the member layer 117 positioned in the rear of the main frame 130.

In addition, the back cover 150 forms a portion of the back surface of the display device 100 and can be connected to the bottom frame 180. One side of the back cover 150 can be coupled with the main frame 130, and the other side can be coupled with the bottom frame 180.

Figure 39:
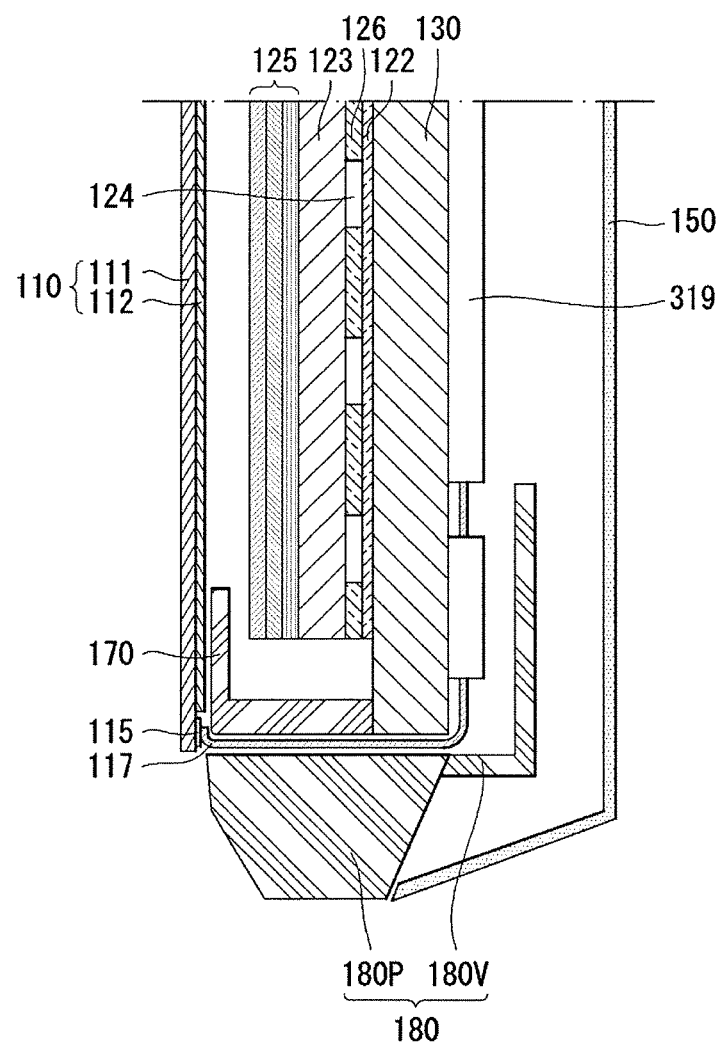

Referring to FIG. 39, a controller or a timing controller board 319 included in a controller can be installed in the rear of the main frame 130. A bracket 170 is coupled with a lower part or a lower side of the main frame 130. The bracket 170 can be coupled with a front surface of the lower part of the main frame 130 and coupled with a lower end of the main frame 130.

Further, an optical layer 123 is positioned in front of the main frame 130, and an optical sheet 125 is positioned in front of the optical layer 123. The optical sheet 125 is positioned on a front surface of the optical layer 123. A light assembly 124 is positioned in the rear of the optical layer 123 and positioned adjacent to a back surface of the optical layer 123. The light assembly 124 provides light for the back surface of the optical layer 123. In addition, the optical layer 123 and/or the optical sheet 125 make light provided by the light assembly 124 travel toward the display panel 110.

Further, the light assembly 124 is mounted on a substrate 122, and a reflective sheet 126 is positioned between the substrate 122 and the optical layer 123. The reflective sheet 126 is positioned around the light assembly 124, and the light assembly 124 is inserted into the reflective sheet 126. The reflective sheet 126 makes light travelling around the light assembly 124 travel toward the front of the light assembly 124.

The display panel 110 is positioned in front and one side of the display panel 110 is exposed to the outside. For example, an upper side, a lower side, and left and right sides of the display panel 110 are exposed to the outside. As discussed above, the display panel 110 includes the front substrate 111 and the back substrate 112. An area of the front substrate 111 can be greater than an area of the back substrate 112, and the back substrate 112 covers a back surface of the front substrate 111 and expose a portion of the front substrate 111 to the outside. Further, an electrode 115 can be formed on the exposed portion of the front substrate 111 and the electrode 115 is electrically connected to an electrode line EL formed on the front substrate 111.

In addition, a member layer 117 is electrically connected to the electrode 115 and contacts the electrode 115. The member layer 117 also extends from the electrode 115 toward the rear of the main frame 130 and is positioned adjacent to a lower surface of the bracket 170. The member layer 117 also surrounds a portion of the lower surface of the bracket 170 and extends toward the rear of the main frame 130. Further, the member layer 117 covers a portion of the lower surface of the bracket 170 and is electrically connected to the controller, for example, the timing controller board 319.

A bottom frame 180 forms a lower part of the display device 100 and is positioned under the bracket 170. The bottom frame 180 is positioned opposite a lower surface of the bracket 170 and under the main frame 130. The bottom frame 180 covers the member layer 117 and includes a horizontal portion 180P and a vertical portion 180V. Further, the horizontal portion 180P is positioned at a lower end of the main frame 130 and is positioned adjacent to the lower surface of the bracket 170. The horizontal portion 180P covers the member layer 117 and protects the display device 100 from an impact generated in the lower part of the display device 100. The vertical portion 180V is also positioned in the rear of the main frame 130. More specifically, the vertical portion 180V is positioned in the rear of the main frame 130 by extending from the horizontal portion 180P and bending. The vertical portion 180V covers the member layer 117 positioned in the rear of the main frame 130.

A back cover 150 forms a portion of the back surface of the display device 100 and is connected to the bottom frame 180. One side of the back cover 150 is coupled with the main frame 130, and the other side is coupled with the bottom frame 180.

The foregoing embodiments are merely examples and are not to be considered as limiting the present disclosure. The present teachings can be readily applied to other types of methods and apparatuses. The features, structures, methods, and other characteristics of the embodiments described herein can be combined in various ways to obtain additional and/or alternative embodiments.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a display panel having a back surface and a front surface;
    a side frame extending along a side of the display panel and including an inner frame facing a part of the back surface of the display panel and an outer frame, the outer frame having an exterior inclined surface inclining towards the display panel;
    a main frame coupled with the side frame; and
    a light source between the display panel and the main frame, wherein the part of the back surface of the display panel is fixed on the inner frame of the side frame, wherein the side frame includes a coupling protrusion, and wherein the main frame is inserted into a space formed by the coupling protrusion of the side frame.

2. The display device of claim 1, wherein the coupling protrusion protrudes toward an inside of the side frame.

3. The display device of claim 1, wherein the inner frame includes a flat portion facing the part of the back surface of the display panel, and the part of the display panel sits on the flat portion.

4. The display device of claim 3, further comprising an adhesive member attached on the flat portion, wherein the display panel is attached on the adhesive member.

5. The display device of claim 3, wherein the side frame includes a first part along a short side of the display panel and a second part bent from the first part of the side frame along a long side of the display panel, and wherein a cut-out is formed between the first part and the second part of the side frame.

6. The display device of claim 5, wherein the cut-out is formed between the flat portion of the first part of the side frame and the flat portion of the second part of the side frame.

7. The display device of claim 1, wherein the inclined surface of the outer frame is backwardly inclined.

8. The display device of claim 1, wherein the side frame includes a first part along a first short side of the display panel, a second part bent from the first part of the side frame along a long side of the display panel and a third part bent from the second part of the side frame along a second short side of the display panel opposite the first short side of the display panel, and wherein the first part, the second part and the third part of the side frame respectively includes the inclined surface.

9. The display device of claim 1, wherein the side frame further includes a first part along a first short side of the display panel, a second part bent from the first part of the side frame along a first long side of the display panel and a third part bent from the second part of the side frame along a second short side of the display panel opposite the first short side of the display panel, and wherein a first cut-out is formed between the first part and the second part of the side frame, and a second cut-out is formed between the second part and the third part of the side frame.

10. The display device of claim 9, further comprising a bottom frame being coupled with the first part and the third part of the side frame, the bottom frame positioned along a second long side of the display panel opposite the first long side of the display panel.

11. The display device of claim 1, wherein the side frame comprises metal materials.

12. The display device of claim 1, wherein the outer frame forms an outer perimeter of the side frame, the inner frame is positioned inside the outer frame, and a stepped portion is formed by the inner frame and the outer frame, and wherein the main frame sits on the stepped portion.

13. The display device of claim 1, wherein the coupling protrusion includes a guide protrusion protruding along an extension direction of the side frame at a rear of the side frame, wherein the main frame includes a guide groove extending along a side of the main frame, and wherein the guide protrusion is inserted into the guide groove.

14. The display device of claim 1, wherein the coupling protrusion protrudes along an extension direction of the side frame at a rear of the side frame.

15. The display device of claim 1, further comprising:

an optical member between the main frame and the display panel, wherein the side frame includes a groove at its back surface, wherein the optical member has a coupling portion which protrudes toward an outside of the optical member, and wherein the coupling portion of the optical member is inserted into the groove of the side frame.

16. The display device of claim 15, wherein the side frame includes a hanging portion protruding from the groove of the side frame and inserted into the coupling portion.

17. The display device of claim 1, wherein the side frame bends and is positioned on at least two sides of the main frame, and wherein the side frame further includes a cut-out near a corner of the side frame.

18. The display device of claim 17, wherein the cut-out is positioned apart from the corner of the side frame.

19. The display device of claim 1, wherein a front surface at an edge of the display panel is exposed in front of the display device.

20. The display device of claim 1, wherein the main frame has a rectangular plate shape, wherein the side frame is positioned on three sides of the main frame, and wherein the display device further comprises a bottom frame positioned on a remaining side of the main frame and coupled with the side frame.

21. The display device of claim 20, further comprising:

a wire electrically connected to the display panel, extended from one side of the display panel, and passing between the main frame and the bottom frame.

22. A display device comprising:

a display panel;

a side frame extended along a side of the display panel and positioned adjacent to an edge of the display panel, wherein the side frame comprises an inner frame facing a part of the back surface of the display panel, and an exterior frame extended from the inner frame, wherein the exterior frame includes an exterior inclined portion, a main frame coupled with the side frame;

a light source between the display panel and the main frame; and an adhesive member attached on the inner frame, wherein the part of the back surface of the display panel is attached on the adhesive member, wherein a front surface at an edge of the display panel is exposed in front of the display device, wherein the side frame includes a first part along a first short side of the display panel, a second part bent from the first part of the side frame along a first long side of the display panel, and a third part bent from the second part of the side frame along a second short side of the display panel opposite the first short side of the display panel, and wherein the first part, the second part and the third part of the side frame respectively includes a backwardly inclined surface, the inclined surface is an exterior surface of the display device.

23. The display device of claim 22, wherein a first cut-out is formed between the first part and the second part of the side frame and a second cut-out is formed between the second part and the third part of the side frame.

24. The display device of claim 22, wherein the outer frame forms an outer perimeter of the side frame, and the inner frame is positioned inside the outer frame, and
wherein the side frame further comprises a stepped portion formed by the inner frame and the outer frame and configured to seat the main frame.

25. The display device of claim 22, further comprising:
a first reinforcement disposed between the first part and the second part of the side frame; and
a second reinforcement between the second part and the third part of the side frame.

26. The display device of claim 25, wherein at least one of the first reinforcement and the second reinforcement includes a gap formed near a corner to provide flexibility to the at least one of the first reinforcement and the second reinforcement.

27. The display device of claim 22, further comprising:
a bottom frame positioned along a second long side of the display panel opposite the first long side of the display panel and being coupled with the first part and the third part of the side frame.

28. The display device of claim 22, wherein the side frame comprises metal materials.

29. The display device of claim 22, wherein the side frame includes a guide protrusion protruding along an extension direction of the side frame at a rear of the side frame,
wherein the main frame includes a guide groove extending along a side of the main frame, and
wherein the guide protrusion is inserted into the guide groove.

30. The display device of claim 22, wherein the side frame includes a coupling protrusion, and
wherein the main frame is inserted into a space formed by the coupling protrusion of the side frame.

\* \* \* \* \*